(12) United States Patent
Zhang et al.

(10) Patent No.: US 12,093,241 B2
(45) Date of Patent: Sep. 17, 2024

(54) METHOD FOR REPLAYING LOG ON DATA NODE, DATA NODE, AND SYSTEM

(71) Applicant: HUAWEI TECHNOLOGIES CO., LTD., Guangdong (CN)

(72) Inventors: Qiong Zhang, Shanghai (CN); Xuli Li, Shanghai (CN); Heting Li, Shenzhen (CN); Geyong Yao, Shanghai (CN); Xiang Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/147,507

(22) Filed: Dec. 28, 2022

(65) Prior Publication Data

US 2023/0137119 A1     May 4, 2023

Related U.S. Application Data

(63) Continuation of application No. PCT/CN2021/103376, filed on Jun. 30, 2021.

(30) Foreign Application Priority Data

Jun. 30, 2020   (CN) .......................... 202010615640.9

(51) Int. Cl.
*G06F 16/23*     (2019.01)

(52) U.S. Cl.
CPC ...... *G06F 16/2358* (2019.01); *G06F 16/2365* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 7,305,421 | B2 | 12/2007 | Cha et al. |
| 2016/0147859 | A1 | 5/2016 | Lee et al. |
| 2018/0144015 | A1* | 5/2018 | Mittur Venkataramanappa .......... G06F 16/273 |
| 2018/0253468 | A1* | 9/2018 | Gurajada ............ G06F 16/2255 |

FOREIGN PATENT DOCUMENTS

| | | |
|---|---|---|
| CN | 104731956 A | 6/2015 |
| CN | 109271450 A | 1/2019 |
| EP | 3401804 A1 | 11/2018 |
| EP | 4170509 A1 | 4/2023 |

* cited by examiner

*Primary Examiner* — Amresh Singh
(74) *Attorney, Agent, or Firm* — WOMBLE BOND DICKINSON (US) LLP

(57) ABSTRACT

A method for replaying a log on a data node, a data node, and a database system are described. The method is used to improve a log replay speed, and includes: the data node obtaining a plurality of logs, wherein the plurality of logs includes at least one transaction commit log and at least one page operation log; and a first thread of a plurality of threads replaying the at least one page operation log, and a same second thread replaying all page operation logs including an operation on a same page. As such, log replay progress does not need to be synchronized between threads. A process in which the first thread replays the transaction commit log is independent of a process in which at least one second thread replays the at least one page operation log.

18 Claims, 11 Drawing Sheets

METHOD FOR REPLAYING LOG ON DATA NODE, DATA NODE, AND SYSTEM

CROSS-REFERENCE TO RELATED APPLICATIONS

This application is a continuation of International Application No. PCT/CN2021/103376, filed on Jun. 30, 2021, which claims priority to Chinese Patent Application No. 202010615640.9, filed on Jun. 30, 2020. The disclosures of the aforementioned applications are hereby incorporated by reference in their entireties.

TECHNICAL FIELD

Embodiments of this application relate to the field of database technologies, and in particular, to a method for replaying a log on a data node, a data node, and a system.

BACKGROUND

To ensure normal running of a server, at least two data nodes are usually established on the server. One data node is used as a primary server, and other data nodes are used as secondary servers. Normally, the primary server provides data services, and the secondary server replays a transaction log on the primary server to ensure data consistency with the primary server. If the primary server is faulty or shut down due to other reasons, the secondary server becomes the primary server and provides data services.

However, if there are logs that are not completely replayed on the secondary server, the secondary server needs to replay all the logs before the secondary server provides data services. Therefore, to enable the secondary server to provide data services as soon as possible, the secondary server randomly allocates to-be-replayed logs to a plurality of threads. In this way, the plurality of threads can concurrently replay the logs to improve a log replay speed.

In a conventional log replay method, a log corresponding to a next transaction can be replayed only after all logs corresponding to a transaction are replayed. Therefore, the log replay speed is still not fast enough.

SUMMARY

Embodiments of this application provide a method for replaying a log on a data node, a data node, and a database system. The method can improve a log replay speed.

A first aspect of this application provides a method for replaying a log on a data node, where a plurality of threads run on the data node, and the method includes various operations described herein.

The data node obtains a plurality of logs, where the plurality of logs include at least one transaction commit log and at least one page operation log, each of the at least one transaction commit log includes a transaction commit operation, and each of the at least one page operation log includes one or more operations on one page. The page operation log may include only an operation of inserting one row to a specific page. In addition to the operation of inserting one row to the specific page, the page operation log may further include an operation of deleting another row from the specific page. The page operation log may include an operation of inserting two rows to the specific page and an operation of deleting one row from the specific page.

The data node replays the at least one transaction commit log by using a first thread of the plurality of threads.

Generally, the first thread sequentially replays the at least one transaction commit log based on a log sequence number (LSN) of the transaction commit log. The data node replays the at least one page operation log by using at least one second thread of the plurality of threads, where all page operation logs that are in the at least one page operation log and that include an operation on a same page are replayed by using a same second thread. The same second thread may replay page operation logs that include operations on different pages. A process in which the first thread replays the at least one transaction commit log is independent of a process in which the at least one second thread replays the at least one page operation log.

Because the same second thread replays all the page operation logs including an operation on a same page, log replay progress does not need to be synchronized between threads, and a log replay speed is improved compared with a case in which a plurality of second threads replay all the page operation logs including an operation on a same page. A process in which the first thread replays a transaction commit log is independent of a process in which any second thread replays a page operation log. Therefore, even if replaying of a transaction commit log corresponding to a current transaction is not completed, a page operation log corresponding to a next transaction can be replayed. This further increases a replay speed.

In an embodiment, where the data node obtains a plurality of logs includes: obtaining the at least one transaction commit log and at least one operation log from a buffer; and the data node parses the at least one operation log on a per-page basis, to obtain the at least one page operation log, where each of the at least one operation log includes an operation on one or more pages; and the at least one page operation log includes a first page operation log, and a log sequence number LSN of the first page operation log is the same as an LSN of an operation log which is parsed to obtain the first page operation log.

Compared with reading a log from a data memory, reading the plurality of logs from the buffer can reduce a quantity of input/output I/O times of the data memory, and can increase a log reading speed. Therefore, a log replay speed is improved. In addition, this embodiment provides a feasible solution for obtaining a page operation log.

In an embodiment, the method further includes: The data node determines a maximum visible LSN, where the maximum visible LSN indicates log replay progress; and all transaction commit logs whose log sequence numbers LSNs are less than or equal to the maximum visible LSN in the at least one transaction commit log are replayed, and all page operation logs whose log sequence numbers LSNs are less than or equal to the maximum visible LSN in the at least one page operation log are replayed.

An LSN corresponding to one of the plurality of logs is a first LSN, all transaction commit logs whose LSNs are less than or equal to the first LSN in the at least one transaction commit log are replayed, and if all page operation logs whose LSNs are less than or equal to the first LSN in the at least one page operation log are replayed, the first LSN is considered as the maximum visible LSN. This avoids a case in which the maximum visible LSN is incorrect because of discontinuous log replay. Therefore, in this embodiment, the maximum visible LSN can accurately indicate log replay progress, and data consistency can be ensured by using the log replay progress.

In an embodiment, where the data node replays the at least one transaction commit log by using a first thread of the plurality of threads includes: The data node replays, by using the first thread of the plurality of threads, the at least one transaction commit log on an initial version of a first page in an LSN sequence, to obtain a plurality of versions of the first page, and each of the plurality of versions of the first page is associated with at least one of the at least one transaction commit log. A quantity of versions of the first page is not limited in this embodiment of this application. The plurality of versions of the first page include a first version of the first page and a second version of the first page that is generated based on the first version of the first page, where the second version of the first page is obtained by replaying, on the first version of the first page in the LSN sequence, transaction commit logs associated with the first version of the first page.

Content of the first page after any transaction commit log is replayed can be viewed based on the plurality of versions of the first page.

In an embodiment, the method further includes: After the data node obtains the plurality of versions of the first page, the data node writes the plurality of versions of the first page into a double write file; and the data node writes the plurality of versions of the first page in the double write file into a data file.

The data node first writes the plurality of versions of the first page into the double write file, and then writes the plurality of versions of the first page from the double write file into the data file. This can ensure that the plurality of versions of the first page are not damaged.

In an embodiment, one version of the first page is generated, on the initial version of the first page, each time a specific quantity of transaction commit logs are replayed. Therefore, a quantity of transaction commit logs associated with each of the plurality of versions of the first page is the same.

In an embodiment, one version of the first page is generated, on the initial version of the first page, each time a transaction commit log is replayed for a period of time. Therefore, replay time of transaction commit logs associated with each of the plurality of versions of the first page is the same.

In an embodiment, the method further includes: The data node replays, in response to a first indication, on a reference version of the first page in an LSN sequence, transaction commit logs associated with the reference version of the first page until the first transaction commit log is replayed, to obtain a target version of the first page, where the first indication is used to query log replay progress of the at least one transaction commit log. The first indication may be in a plurality of forms. The reference version of the first page is a version that is associated with the first transaction commit log and that is in the plurality of versions of the first page, and the first transaction commit log is a log whose LSN is the largest and whose LSN is less than or equal to the maximum visible LSN in the at least one transaction commit log.

The method further includes: determining the log replay progress of the at least one transaction commit log based on the target version of the first page.

The log replay progress can be fed back in real time and accurately based on the plurality of versions of the first page and the maximum visible LSN. This ensures data consistency.

In an embodiment, where the data node replays the at least one page operation log by using at least one second thread of the plurality of threads includes: The data node replays, by using one second thread of the plurality of threads, on an initial version of a second page in an LSN sequence, all page operation logs that are in the at least one page operation log and that include an operation on the second page, to obtain a plurality of versions of the second page, and each of the plurality of versions of the second page is associated with at least one of all the page operation logs including the operation on the second page. A quantity of versions of the second page is not limited in this embodiment of this application. The plurality of versions of the second page include a first version of the second page and a second version of the second page that is generated based on the first version of the second page, where the second version of the second page is obtained by replaying, on the first version of the second page in the LSN sequence, page operation logs associated with the first version of the second page.

Content of the second page after any page operation log is replayed can be viewed based on the plurality of versions of the second page.

In an embodiment, the method further includes: After the data node obtains the plurality of versions of the second page, the data node writes the plurality of versions of the second page into a double write file; and the data node writes the plurality of versions of the second page in the double write file into a data file.

The data node first writes the plurality of versions of the second page into the double write file, and then writes the plurality of versions of the second page from the double write file into the data file. This can ensure that the plurality of versions of the second page are not damaged.

In an embodiment, one version of the second page is generated, on the initial version of the second page, each time a specific quantity of transaction commit logs are replayed. Therefore, a quantity of page operation logs associated with each of the plurality of versions of the second page is the same.

In an embodiment, one version of the second page is generated, on the initial version of the second page, each time a page operation log is replayed for a period of time. Therefore, replay time of page operation logs associated with each of the plurality of versions of the second page is the same.

In an embodiment, the method further includes: The data node replays, in response to a second indication, on a reference version of the second page in the LSN sequence, transaction commit logs associated with the reference version of the second page until a first page operation log is replayed, to obtain a target version of the second page, where the second indication is used to query log replay progress of the at least one page operation log. The reference version of the second page is a version that is associated with the first page operation log and that is in the plurality of versions of the second page, and the first page operation log is a log whose LSN is the largest and whose LSN is less than or equal to the maximum visible LSN in all the page operation logs including the operation on the second page.

The method further includes determining the log replay progress of the at least one page operation log based on the target version of the second page.

The log replay progress can be fed back in real time and accurately based on the plurality of versions of the second page and the maximum visible LSN. This ensures data consistency.

A second aspect of this application provides a data node, where a plurality of threads run on the data node, and the data node includes:

an obtaining unit, configured to obtain a plurality of logs, where the plurality of logs include at least one transaction commit log and at least one page operation log, each of the at least one transaction commit log includes a transaction commit operation, and each of the at least one page operation log includes one or more operations on one page;

a first replay unit, configured to replay the at least one transaction commit log by using a first thread of the plurality of threads; and a second replay unit, configured to replay the at least one page operation log by using at least one second thread of the plurality of threads, where all page operation logs that are in the at least one page operation log and that include an operation on a same page are replayed by using a same second thread.

A process in which the first thread replays the at least one transaction commit log is independent of a process in which the at least one second thread replays the at least one page operation log.

In an embodiment, the obtaining unit is configured to: obtain the at least one transaction commit log and the at least one operation log from a buffer; and parse the at least one operation log to obtain the at least one page operation log, where each of the at least one operation log includes an operation on one or more pages; and the at least one page operation log includes a first page operation log, and an LSN of the first page operation log is the same as an LSN of an operation log which is parsed to obtain the first page operation log.

In an embodiment, the data node further includes a determining unit, configured to determine a maximum visible LSN, where the maximum visible LSN indicates log replay progress; and all transaction commit logs whose log sequence numbers LSNs are less than or equal to the maximum visible LSN in the at least one transaction commit log are replayed, and all page operation logs whose log sequence numbers LSNs are less than or equal to the maximum visible LSN in the at least one page operation log are replayed.

In an embodiment, the first replay unit is configured to replay the at least one transaction commit log in an LSN sequence on an initial version of a first page by using a first thread of the plurality of threads, to obtain a plurality of versions of the first page, and each of the plurality of versions of the first page is associated with at least one of at least one transaction commit log; and the plurality of versions of the first page include a first version of the first page and a second version of the first page that is generated based on the first version of the first page, where the second version of the first page is obtained by replaying, on the first version of the first page in the LSN sequence, transaction commit logs associated with the first version of the first page.

In an embodiment, the data node further includes a writing unit, configured to: write the plurality of versions of the first page into a double write (double write) file; and write the plurality of versions of the first page in the double write file into a data (data) file.

In an embodiment, a quantity of transaction commit logs associated with each of the plurality of versions of the first page is the same, or replay time of transaction commit logs associated with each of the plurality of versions of the first page is the same.

In an embodiment, the first replay unit is further configured to replay, in response to a first indication, on a reference version of the first page in an LSN sequence, transaction commit logs associated with the reference version of the first page until the first transaction commit log is replayed, to obtain a target version of the first page, where the first indication is used to query log replay progress of the at least one transaction commit log.

The reference version of the first page is a version that is associated with the first transaction commit log and that is in the plurality of versions of the first page, and the first transaction commit log is a log whose LSN is the largest and whose LSN is less than or equal to the maximum visible LSN in the at least one transaction commit log.

The first replay unit is further configured to determine the log replay progress of the at least one transaction commit log based on the target version of the first page.

In an embodiment, the second replay unit is configured to replay, on an initial version of a second page by using one second thread of the plurality threads in an LSN sequence, all page operation logs that are in the at least one page operation log and that include the operation on the second page, to obtain a plurality of versions of the second page, and each of the plurality of versions of the second page is associated with at least one of all page operation logs including an operation on the second page.

The plurality of versions of the second page include a first version of the second page and a second version of the second page that is generated based on the first version of the second page, where the second version of the second page is obtained by replaying, on the first version of the second page in the LSN sequence, page operation logs associated with the first version of the second page.

In an embodiment, the data node further includes a writing unit, configured to: write the plurality of versions of the second page into a double write file; and write the plurality of versions of the second page in the double write file into a data file.

In an embodiment, a quantity of page operation logs associated with each of the plurality of versions of the second page is the same, or replay time of page operation logs associated with each of the plurality of versions of the second page is the same.

In an embodiment, the second replay unit is further configured to replay, in response to a second indication, on a reference version of the second page in the LSN sequence, transaction commit logs associated with the reference version of the second page until a first page operation log is replayed, to obtain a target version of the second page, where the second indication is used to query log replay progress of the at least one page operation log.

The reference version of the second page is a version that is associated with the first page operation log and that is in the plurality of versions of the second page, and the first page operation log is a log whose LSN is the largest and whose LSN is less than or equal to the maximum visible LSN in all the page operation logs including the operation on the second page.

The second replay unit is further configured to determine the log replay progress of the at least one page operation log based on the target version of the second page.

A third aspect of this application provides a data node, including at least one processor and a memory, where the memory stores computer-executable instructions that can be run on the processor, and when the computer-executable instructions are executed by the processor, the data node performs the method for replaying a log on a data node according to any one of the embodiments of the first aspect.

A fourth aspect of this application provides a chip or a chip system. The chip or the chip system includes at least one processor and a communication interface. The communication interface is interconnected to the at least one processor by using a line. The at least one processor is configured to run a computer program or instructions, to perform the method for replaying a log on a data node according to any one of the embodiments of the first aspect.

A fifth aspect of this application provides a computer storage medium. The computer storage medium is configured to store computer software instructions used by the foregoing terminal device, and the computer software instructions include a program designed for a data node; and the data node may be the data node described in the third aspect.

A sixth aspect of this application provides a computer program product, where the computer program product includes computer software instructions, and the computer software instructions may be loaded by a processor to implement the method for replaying a log on a data node according to any one of the embodiments of the first aspect.

A seventh aspect of this application provides a database system, including a primary server and at least one secondary server.

The primary server is configured to send a log to the at least one secondary server; and Each of the at least one secondary server is configured to replay the log according to the method according to any one of the embodiments of the first aspect.

According to the foregoing technical solutions, it can be learned that embodiments of this application have the following advantages.

A same second thread replays all page operation logs including an operation on a same page. Therefore, log replay progress does not need to be synchronized between threads, and a log replay speed is improved compared with a case in which a plurality of second threads replay all page operation logs including an operation on a same page. A process in which the first thread replays a transaction commit log is independent of a process in which any second thread replays a page operation log. Therefore, even if replaying of a transaction commit log corresponding to a current transaction is not completed, a page operation log corresponding to a next transaction can be replayed. This further increases a replay speed.

DESCRIPTION OF EMBODIMENTS

The following describes embodiments of this application with reference to accompanying drawings. It is clear that the described embodiments are merely some rather than all of embodiments of this application. A person of ordinary skill in the art may learn that, with development of technologies and emergence of a new scenario, the technical solutions provided in embodiments of this application are also applicable to a similar technical problem.

In the specification, claims, and accompanying drawings of this application, the terms "first", "second", and the like are intended to distinguish between similar objects but do not necessarily indicate a specific sequence or sequence. It should be understood that the data termed in such a way are interchangeable in proper circumstances so that embodiments described herein can be implemented in other sequences than the sequence illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

The method provided in embodiments of this application may be applied to a database system. Generally, a database system includes the following three parts. (1) A database (DB), which is a set of organized and shareable data that is stored in a computer for a long time; and data in the database is organized, described, and stored based on a certain mathematical model, has small redundancy, high data independence, and easy scalability, and can be shared by various users. (2) Hardware, including a data memory required for data storage, for example, a memory and/or a magnetic disk. (3) Software, including a database management system (DBMS), where the DBMS is core software of a database system, and is system software used to organize and store data, and efficiently obtain and maintain data, and a database engine is a core component of the DBMS.

Figure 1A:
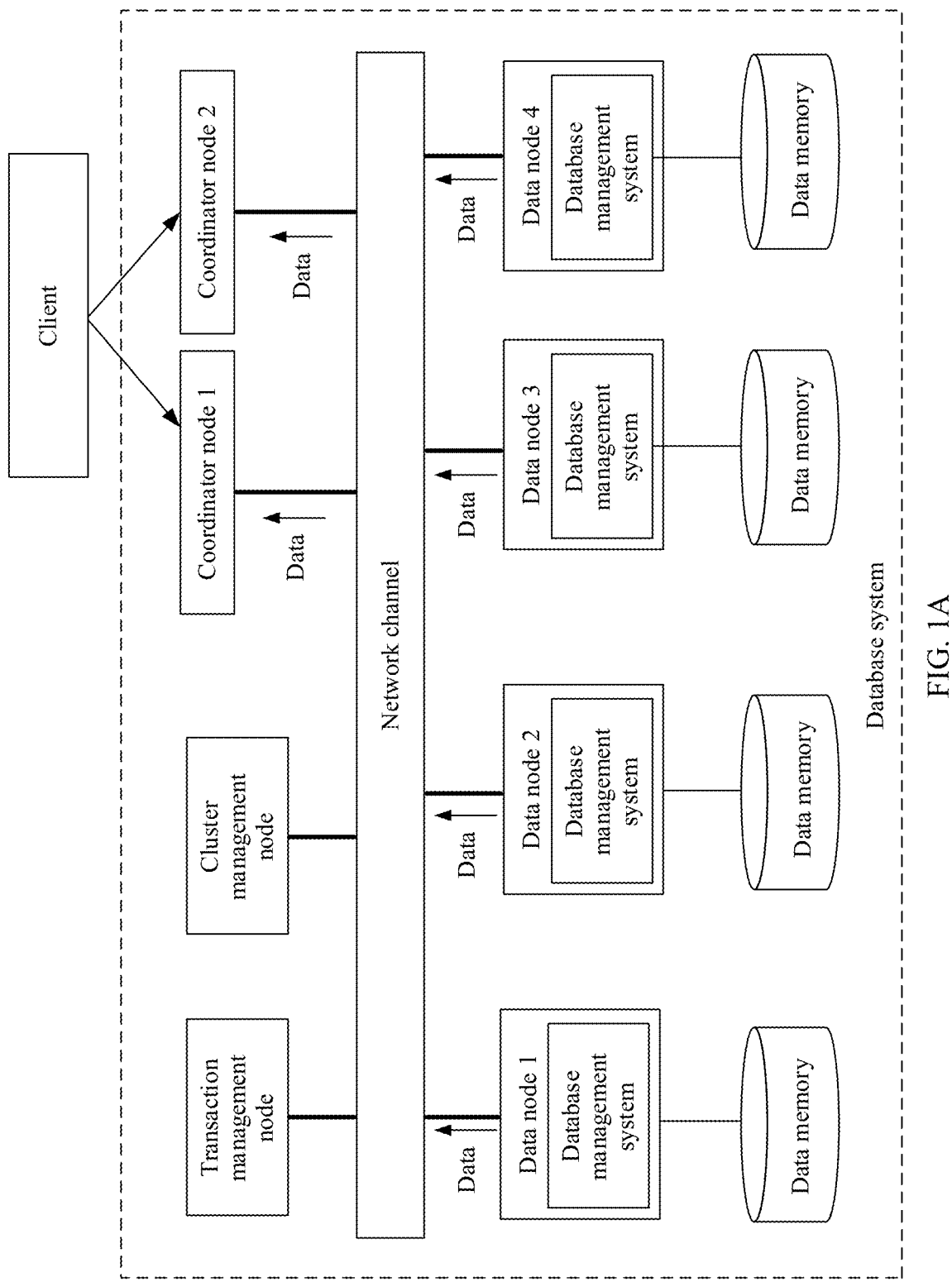
FIG. 1A is a schematic diagram of a single-server database system.

FIG. 1A is a schematic diagram of a cluster database system using a shared-nothing architecture. Each data node has an exclusive hardware resource (such as a data memory), an exclusive operating system, and an exclusive database, and data nodes communicate with each other by using a network. In this system, to improve a fault resistance capability of the database system, one data node is usually used as a primary server to provide a database service, and other data nodes are used as secondary servers. When the primary server is faulty or a load on the primary server is heavy, one or more secondary servers are selected as the primary server to provide a database service. To ensure data consistency between the primary server and the secondary servers, the primary server needs to continuously synchronize logs to the secondary servers through streaming replication and replay the logs on the secondary servers. Based on this, logs may be replayed on the secondary servers by using the method provided in embodiments of this application. In addition, because the primary server may also be restarted after the primary server is shut down, logs may also be replayed on the primary server by using the method provided in embodiments of this application. In the cluster database system shown in FIG. 1A, the data node herein may be a physical machine or a virtual machine.

In FIG. 1A, a coordinator node 1 and a coordinator node 2 serve as entrances for clients to connect to the database system, a transaction management node is configured to provide a database transaction management service, and a cluster management node is configured to provide a cluster management service.

In all embodiments of this application, a data memory (data storage) of the database system includes but is not limited to a solid-state drive (SSD), a disk array, or another type of non-transitory computer-readable medium. Although a database is not shown in FIG. 1A, it should be understood that the database is stored in the data memory. A person skilled in the art may understand that a database system may include fewer or more components than components shown in FIG. 1B, or include components different from the components shown in FIG. 1A. For example, although four data nodes are described in FIG. 1A, a person skilled in the art may understand that a cluster database system may include any quantity of data nodes. Functions of a database management system of each data node may be implemented by a proper combination of software, hardware, and/or firmware that are running on each data node.

Figure 1B:
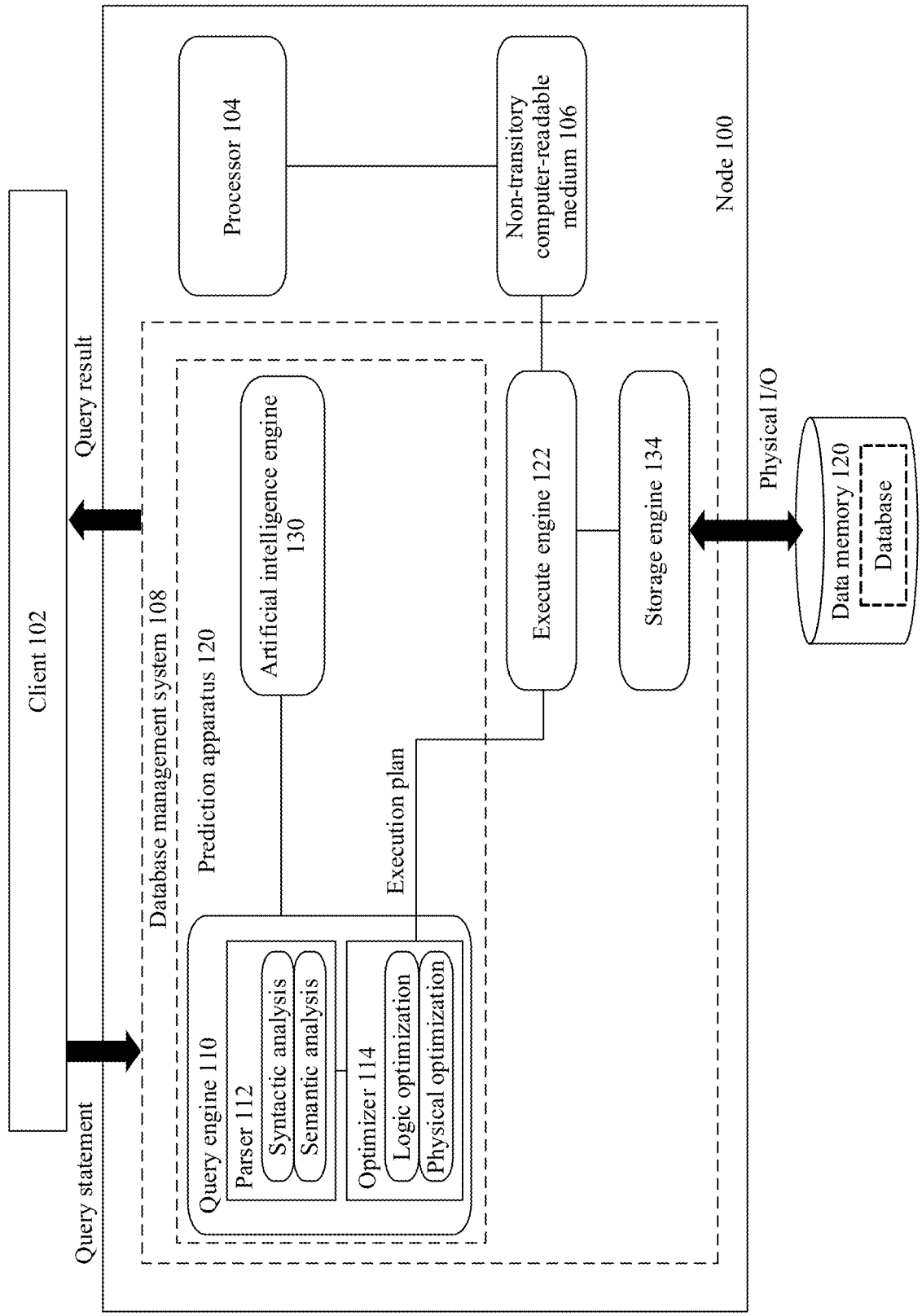
FIG. 1B is a schematic diagram of a cluster database system using a shared-nothing architecture.

The database system in FIG. 1A includes a data node. The following describes a structure of the data node with reference to the accompanying drawings. As shown in FIG. 1B, an embodiment of this application provides a data node 100, including at least one processor 104, a non-transitory computer-readable medium 106 storing executable code, and a database management system 108. When the executable code is executed by the at least one processor 104, the executable code is configured to implement components and functions of the database management system 108. The non-transitory computer-readable medium 106 may include one or more non-volatile memories. For example, the non-volatile memory includes a semiconductor storage device such as an erasable programmable read-only memory (EPROM), an electrically erasable read-only memory (EEPROM), and a flash memory; and a disk such as an internal hard disk or a removable disk, a magneto-optical disk, a CD ROM, and a DVD-ROM. In addition, the non-transitory computer-readable medium 106 may further include any device configured as a main memory. The at least one processor 104 may include any type of general-purpose computing circuit or application-specific logic circuit, for example, a field-programmable gate array (FPGA) or an application-specific integrated circuit (ASIC). The at least one processor 104 may alternatively be one or more processors coupled to one or more semiconductor substrates, such as a CPU.

The database management system 108 may be a relational database management system (RDBMS). The database management system 108 supports a structured query language (SQL). Generally, the SQL is a dedicated programming language dedicated for managing data stored in a relational database. The SQL may be any type of data-related language, including a data definition language and a data manipulation language, and functions of the SQL may include data insertion, querying, updating, and deletion, mode creation and modification, and data access control. In addition, in some examples, the SQL may include descriptions related to various language elements, including a clause, an expression, a predicate, and a query. The query statement is usually referred to as "query" for short. For example, the clause may be various constituents of the statement and the query, and in some cases, the clause may be considered as optional. In addition, the expression may be configured to generate a scalar value and/or a table including a data column and/or row. In addition, a specified condition may be configured for the predicate, to adjust an effect of the statement and the query.

The query statement is a request to view, access, and/or manipulate data stored in the database. The database management system 108 may receive a query in an SQL format (referred to as an SQL query) from a database client 102. The SQL query may also be referred to as an SQL statement. The database management system 108 usually generates, by accessing related data in the database and manipulating the related data, a query result corresponding to the query, and returns the query result to the database client 102. A database is a set of data organized, described, and stored based on a mathematical model. The database may include one or more database structures or formats, such as row storage and column storage. The database is typically stored in a data memory, such as an external data memory 120 in FIG. 1B, or the non-transitory computer-readable medium 106. When the database is stored in the non-transitory computer-readable medium 106, the database management system 108 is a memory database management system.

The database client 102 may include any type of device or application program configured to interact with the database management system 108. In some examples, the database client 102 includes one or more application servers.

The database management system 108 includes an SQL engine 110, an execute engine 122, and a storage engine 134. The SQL engine 110 generates a corresponding execution plan based on an SQL statement submitted by the client 102, such as a query. The execute engine 122 performs an operation based on the execution plan of the statement, to generate a query result. The storage engine 134 is responsible for managing actual content of data and an index of a table in a file system, and also manages data such as a cache, a buffer, a transaction, and a log during running of the storage engine 134. For example, the storage engine 134 may write an execution result of the execute engine 122 into the data memory 120 through physical I/O. The SQL engine 110 includes a parser 112 and an optimizer 114. The parser 112 is configured to: perform syntax and semantic analysis on the SQL statement, expand a query view, and obtain smaller query blocks through division. The optimizer 114 generates, for the statement, a group of execution plans that are possibly used, estimates costs of each execution plan, compares costs of the plans, and finally selects an execution plan with least costs.

Based on the foregoing description, it can be learned that when the primary server is restarted after the primary server is shut down, logs need to be replayed on both of the primary server and the secondary server. In addition, in a case in which the primary server is restarted or the secondary server becomes the primary server, external services can be provided only after the logs are replayed. Therefore, if a log replay speed is not fast enough, it takes a long time to restore the database.

In a scenario in which a primary server in a single-server database system or a cluster database system is restarted after the primary server is shut down, if a log replay speed is not fast enough, the primary server needs to wait a long time to provide an external service after the primary server is restarted. As a result, the waiting time exceeds a recovery time objective (RTO). The RTO refers to a maximum tolerable time for a computer, a system, a network, or an application to stop working after a fault or disaster occurs. In a scenario in which logs are replayed on the secondary server, logs are accumulated on the secondary server if the log replay speed is not fast enough. As a result, the secondary server needs to wait for a long time after the primary server becomes the primary server, to provide an external service, and the waiting time exceeds the RTO.

Therefore, an embodiment of this application provides a method for replaying a log on a data node. Logs are divided into a transaction commit log and a log related to a page operation, and different threads are separately used to submit the transaction commit log and the log related to the page operation. Therefore, a log does not need to be replayed by using a transaction as a unit. In addition, the log related to the page operation may be replayed by using a plurality of threads, to further increase a transaction replay speed.

In this embodiment of this application, a log may be a redo log. It should be noted that the method provided in this embodiment of this application may be adaptively adjusted, and then another log such as an undo log is replayed by using an adjusted method.

Figure 2:
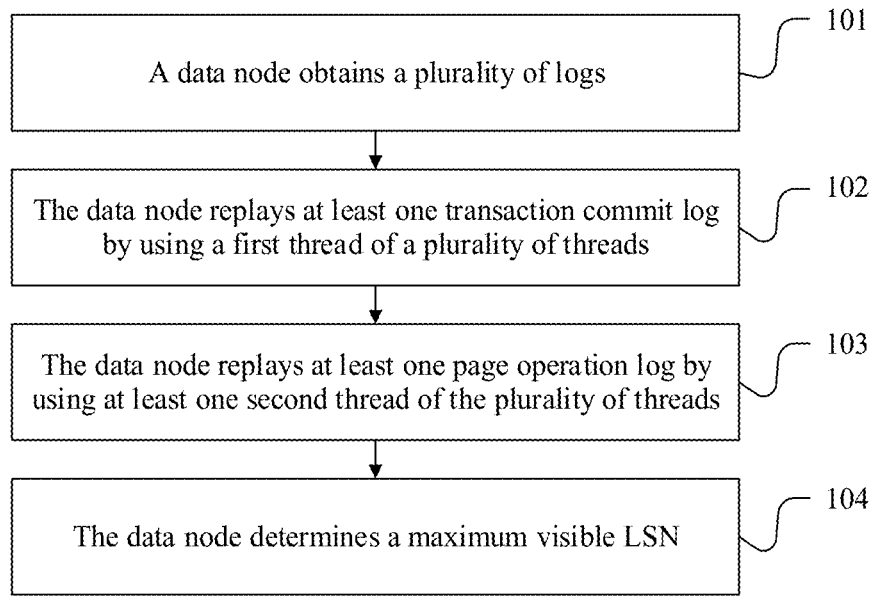
FIG. 2 is a schematic diagram of a first embodiment of a log replay method according to an embodiment of this application.

FIG. 2 is a flow diagram that provides an illustration of an embodiment of a method for replaying a log on a data node. In this embodiment, a plurality of threads run on the data node. Based on this, the method in this embodiment of this application includes the following operations.

At block 101, the data node obtains a plurality of logs.

The plurality of logs include at least one transaction commit log and at least one page operation log, each of the at least one transaction commit log includes a transaction commit operation, and each of the at least one page operation log includes one or more operations on one page.

A quantity and types of operations on a same page that are included in the page operation log are not limited in this embodiment of this application. For example, the page operation log may include only an operation of inserting one row to a specific page. For example, in addition to an operation of inserting one row to a specific page, the page operation log may further include an operation of deleting another row from the specific page. For another example, the page operation log may include an operation of inserting two rows to a specific page and an operation of deleting one row from the specific page.

There are several methods for obtaining the plurality of logs. This is not limited in this embodiment of this application. Methods for obtaining the transaction commit log and the page operation log may be different. The following describes how to obtain the plurality of logs.

At block 102, the data node replays the at least one transaction commit log by using a first thread of the plurality of threads.

After the first thread obtains the plurality of logs, the first thread replays transaction commit logs in the plurality of logs.

There are a plurality of methods for replaying the transaction commit logs by the first thread. For example, a transaction commit operation in a transaction commit log is performed on an initial page, to update the initial page. Then, on the updated initial page, a transaction commit operation in a next transaction commit log is performed, to further update the updated initial page. The foregoing process is repeatedly performed. In this way, the transaction commit log can be replayed, and finally the latest updated version of the initial page can be obtained. In a process of replaying the transaction commit log, the initial page may be a blank page, or may be an existing non-blank page in the database.

The first thread usually replays the transaction commit logs in a sequence based on log sequence numbers LSNs of the transaction commit logs, to ensure data consistency.

In addition, the transaction commit logs may also be replayed in another manner, which is described in detail in the following.

At block 103, the data node replays the at least one page operation log by using at least one second thread of the plurality of threads.

When there is a plurality of page operation logs, a plurality of second threads may be used for parallel replay, to improve a replay speed of the page operation logs.

If the plurality of second threads is used for parallel back, all page operation logs that are in the at least one page operation log and that include an operation on a same page are replayed by using a same second thread.

It may be understood that the same second thread may replay page operation logs that include operations on different pages. For example, all page operation logs including an operation on a page 11 and all page operation logs including an operation on a page 22 may be replayed by the same second thread.

Similar to the replay transaction commit log, the replay page operation log also needs to be performed on an initial page. A difference lies in that the initial page may be a blank page, or may be an existing non-blank page in the database. All page operation logs including an operation on an initial page are used as an example. If all page operation logs including an operation on the initial page are replayed by one second thread, only one second thread needs to obtain the initial page. If all page operation logs including an operation on the initial page are separately replayed by two second threads, both of the two second threads need to obtain the initial page. Therefore, when all page operation logs including an operation on a same page are replayed by a same second thread, the second thread does not need to obtain an initial page.

Similarly, the second thread usually replays the page operation logs in a sequence based on the LSNs of the page operation logs, to ensure data consistency. Therefore, if all page operation logs including an operation on a same page are replayed by a plurality of second threads, to ensure data consistency, log replay progress needs to be synchronized between the plurality of second threads. In this way, it can be ensured that replay is performed in the sequence based on the LSNs of the page operation logs. If all page operation logs including an operation on a same page are replayed by a same second thread, log replay progress does not need to be synchronized between the plurality of second threads.

A process in which the first thread replays the at least one transaction commit log is independent of a process in which the at least one second thread replays the at least one page operation log. It may also be understood that a process in which the first thread replays the at least one transaction commit log and a process in which the at least one second thread replays the at least one page operation log are parallel and do not interfere with each other. For a transaction commit log and a page operation log that are corresponding to a same transaction, a process in which the first thread replays the transaction commit log and a process in which the second thread replays the page operation log are performed independently, and the first thread does not need to synchronize log replay progress of the transaction commit log to the second thread, the second process does not need to synchronize log replay progress of the page operation log to the first thread either. Therefore, a process in which the first thread replays the transaction commit log can be performed without waiting for completion of replaying the page operation log by the second thread. For different transactions, a process in which the first thread replays the transaction commit log and a process in which the second thread replays the page operation log are also performed independently. The second thread can replay a page operation log corresponding to a next transaction without waiting for completion of replaying of a transaction commit log corresponding to a current transaction by the first thread.

Figure 3:
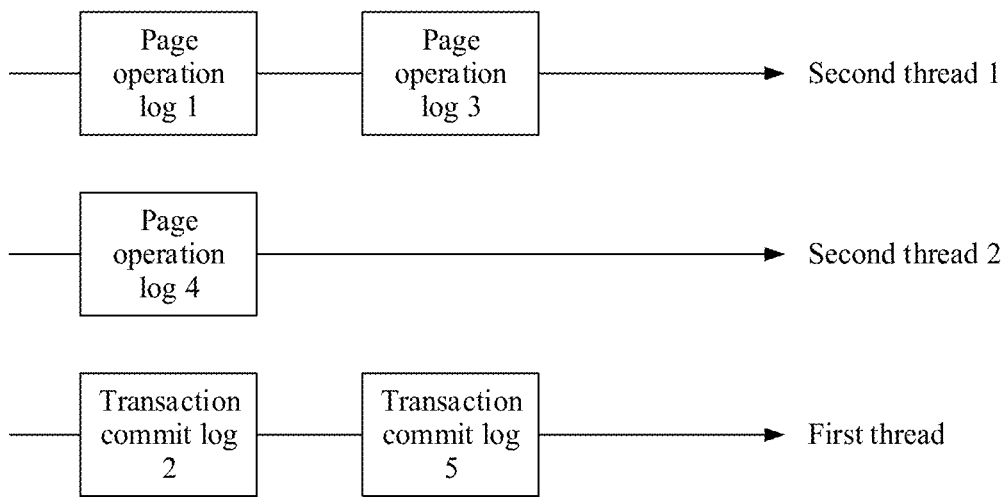
FIG. 3 is a schematic diagram of a second embodiment of a log replay method according to an embodiment of this application.

The following describes the log replay process in this embodiment of this application by using an example. As shown in FIG. 3, in this example, a log of a first transaction includes a page operation log 1 and a transaction commit log 2, a log of a second transaction includes a page operation log 3, a page operation log 4, and a transaction commit log 5, and the page operation log 1 and the page operation log 3 correspond to a same page. Log replay is performed by using the method provided in this embodiment of this application. In this case, the page operation log 1 and the page operation log 3 are replay by using a second thread 1, and the page operation log 4 is replay by using a second thread 2. The transaction commit log 2 and the transaction commit log 5 are replayed by a first thread.

In a log replay process, for the first transaction, a process in which the first thread replays the transaction commit log 2 is independent of a process in which the second thread 1 replays the page operation log 1, and the transaction commit log 2 can be replayed without waiting for completion of replaying the page operation log 1. Therefore, the log replay progress does not need to be synchronized between the first thread and the second thread 1. For the second transaction, a process in which the first thread replays the transaction commit log 5 is independent of a process in which the second thread 1 replays the page operation log 3, and a process in which the first thread replays the transaction commit log 5 is independent of a process in which the second thread 2 replays the page operation log 4. Therefore, the log replay progress does not need to be synchronized between the first thread and the second thread 1, and the log replay progress does not need to be synchronized between the first thread and the second thread 2.

In addition, because the page operation log 1 and the page operation log 3 that are corresponding to a same page are replayed by the second thread 1, and the page operation log 4 is replayed by the second thread 2, log replay between the second thread 1 and the second thread 2 is also independent, and the log replay progress does not need to be synchronized between the second thread 1 and the second thread 2.

It can be learned based on the foregoing description that, in this embodiment of this application, a same second thread replays all page operation logs including an operation on a same page. Therefore, log replay progress does not need to be synchronized between threads, and a log replay speed is improved compared with a case in which a plurality of second threads replay all page operation logs including an operation on a same page. A process in which the first thread replays a transaction commit log is independent of a process in which any second thread replays a page operation log. Therefore, even if replaying of a transaction commit log corresponding to a current transaction is not completed, a page operation log corresponding to a next transaction can be replayed. This further increases a replay speed.

The following describes an example process of obtaining a plurality of logs.

First, the data node may read the plurality of logs from a data memory or a buffer.

The buffer is a piece of memory, and is configured to interact with the data memory to read and write a log. When the primary server synchronizes logs to the secondary server through streaming replication, the logs are synchronized to a buffer of the secondary server, and then the logs into the buffer are updated to the data memory. It should be noted that the logs into the buffer are cleared only after the logs are read during log replay. Therefore, the logs are not cleared from the buffer because the logs are updated to the data memory.

Therefore, when the primary server and the secondary server are in a streaming replication state, the plurality of logs may be read from the buffer; and when the primary server and the secondary server are not in the streaming replication state, for example, when the primary server is restarted after the primary server is shut down, the plurality of logs may be read from the data memory.

It may be understood that, compared with reading a log from a data memory, reading the plurality of logs from the buffer can reduce a quantity of input/output (I/O) times of the data memory, and can increase a log reading speed. Therefore, a log replay speed is increased.

Generally, the plurality of logs include a transaction commit log and an operation log. The operation log may be understood as a log related to a table, and includes an operation on one or more pages in a table. In addition, each of the plurality of logs corresponds to one LSN.

Based on the foregoing description, for example, that the data node obtains a plurality of logs includes: The data node parses at least one operation log to obtain at least one page operation log, and each of the at least one operation log includes an operation on one or more pages.

It should be noted that a process in which the data node parses the operation log is performed on a per-page basis. For example, if the operation log includes a total of 15 types of operations on 10 pages, the operation log is parsed into 10 pages of operation logs, that is, a plurality of types of operations corresponding to a same page are included in one page operation log.

An LSN of the operation log is the same as an LSN of a page operation log obtained by parsing the operation log. The at least one page operation log includes a first page operation log, and an LSN of the first page operation log is the same as an LSN of an operation log which is parsed to obtain the first page operation log.

For example, if five page operation logs are obtained by parsing one operation log, LSNs of the five page operation logs are all the same as LSNs of the operation logs.

It should be understood that, if a plurality of threads on the data node synchronize the log replay progress with each other, the data node may obtain the log replay progress based on a synchronization result. This allows a user to view the log replay progress. However, in this embodiment of this application, the log replay progress does not need to be synchronized between the first thread and the second thread, and the log replay progress does not need to be synchronized between the second threads either. Therefore, the log replay progress cannot be obtained through synchronization between threads.

Therefore, as shown in FIG. 2, based on the foregoing embodiments, in another embodiment of the method for replaying a log on a data node provided in this application, the method further includes the following steps.

At block 104, the data node determines a maximum visible LSN, where the maximum visible LSN indicates log replay progress.

All transaction commit logs whose log sequence numbers LSNs are less than or equal to the maximum visible LSN in the at least one transaction commit log are replayed, and all page operation logs whose log sequence numbers LSNs are less than or equal to the maximum visible LSN in the at least one page operation log are replayed.

It may be understood that, when there are a plurality of second threads, the plurality of second threads are parallel and independent, and a process in which the first thread replays a transaction commit log is also independent of a process in which the second thread replays a page operation log. Therefore, log replay may be discontinuous.

For example, an LSN of a transaction commit log currently replayed by the first thread is 100, and an LSN of a page operation log currently replayed by the second thread is 90. Some logs whose LSNs are between 90 and 100 are replayed. In this case, 100 cannot be used as the maximum visible LSN, and only 90 can be used as the maximum visible LSN.

It can be learned based on the foregoing description that, in this embodiment of this application, an LSN corresponding to one of the plurality of logs is a first LSN, all transaction commit logs whose LSNs are less than or equal to the first LSN in the at least one transaction commit log are replayed, and all page operation logs whose LSNs are less than or equal to the first LSN in the at least one page operation log are replayed, the first LSN is used as the maximum visible LSN. This avoids a case in which the maximum visible LSN is incorrect because of discontinuous log replay. Therefore, the maximum visible LSN in this embodiment of this application can accurately indicate the log replay progress, and data consistency can be ensured by using the log replay progress.

The foregoing describes a method for replaying the at least one transaction commit log by the first thread. The following describes another method for replaying the at least one transaction commit log by the first thread.

In an example implementation, that the data node replays the at least one transaction commit log by using a first thread of the plurality of threads includes:

The data node replays the at least one transaction commit log in an LSN sequence on an initial version of a first page by using the first thread of the plurality of threads, to obtain a plurality of versions of the first page, and each of the plurality of versions of the first page is associated with at least one of the at least one transaction commit log.

The plurality of versions of the first page include a first version of the first page and a second version of the first page that is generated based on the first version of the first page, where the second version of the first page is obtained by replaying, on the first version of the first page in the LSN sequence, transaction commit logs associated with the first version of the first page.

A process in which the first thread replays the at least one transaction commit log to obtain the plurality of versions of the first page may be as follows.

The first thread in the data node sequentially associates a specific quantity of transaction commit logs with a version A (that is, the initial version) of the first page in an ascending order of respective LSNs of the at least one transaction commit log.

Then, the data node generates a version B of the first page based on the version A of the first page and the transaction commit logs associated with the version A of the first page. In this case, two versions of the first page are obtained.

Then, the first thread in the data node may continue to associate a specific quantity of transaction commit logs with the version B of the first page in an ascending order of respective LSNs of the at least one transaction commit log.

Then, the data node generates a version C of the first page based on the version B of the first page and the transaction commit logs associated with the version B of the first page. In this case, three versions of the first page are obtained.

The foregoing steps are repeated, to complete replaying of the at least one transaction commit log. In addition, a plurality of versions including the initial version of the first page can be obtained.

It may be understood that, after the plurality of versions of the first page including the initial version of the first page are obtained, the plurality of versions of the first page are usually stored in a memory. To reduce the memory occupied by the plurality of versions of the first page, and prevent the plurality of versions of the first page from disappearing because the data node is shut down, the plurality of versions of the first page are generally written into a data memory.

In this embodiment of this application, a plurality of methods may be used to write the plurality of versions of the first page into the data memory. For example, the data node may directly write the plurality of versions of the first page into a data file in the data memory. Because there is a risk that the plurality of versions of the first page are damaged when the plurality of versions of the first page are directly written into the data file, the data node may write the plurality of versions of the first page into a double write file. Then, the plurality of versions of the first page in the double write file are written into the data file. In this way, it can be ensured that the plurality of versions of the first page are not damaged.

A quantity of versions of the first page is not limited in this embodiment of this application. The plurality of versions of the first page may include two versions, or may include three or more versions. A quantity of transaction commit logs associated with each of the plurality of versions of the first page is not limited in this embodiment of this application either.

For example, a quantity of transaction commit logs associated with each of the plurality of versions of the first page is the same. On the initial version of the first page, one version of the first page is generated each time a specific quantity of transaction commit logs are replayed.

For example, one version of the first page is generated, on the initial version of the first page, each time a transaction commit log is replayed for a period of time. In other words, replay time of transaction commit logs associated with each of the plurality of versions of the first page is the same.

Based on the foregoing description, it can be learned that a transaction commit operation in the transaction commit log may be continuously performed on the initial page, to continuously update the initial page. The at least one transaction commit log is replayed by using this method, and finally only a latest updated version of the initial page can be obtained. However, in this embodiment of this application, a plurality of versions of the first page may be finally obtained. Content of the first page after any transaction commit log is replayed can be viewed based on the plurality of versions of the first page.

Based on the foregoing embodiments, in another embodiment of the method for replaying a log on a data node provided in this application, the method further includes:

the data node replays, in response to a first indication, on a reference version of the first page in an LSN sequence, transaction commit logs associated with the reference version of the first page until the first transaction commit log is replayed, to obtain a target version of the first page, where the first indication is used to query log replay progress of the at least one transaction commit log.

The reference version of the first page is a version that is associated with the first transaction commit log and that is in the plurality of versions of the first page, and the first transaction commit log is a log whose LSN is the largest and whose LSN is less than or equal to the maximum visible LSN in the at least one transaction commit log.

Finally, the method further includes determining the log replay progress of the at least one transaction commit log based on the target version of the first page.

For example, the plurality of versions of the first page include a first version of the first page, a second version of the first page, and a third version of the first page, and each version of the first page is associated with three transaction commit logs. LSNs of three transaction commit logs associated with the first version of the first page are respectively 2, 5, and 8. LSNs of three transaction commit logs associated with the second version of the first page are respectively 12, 15, and 18. LSNs of three transaction commit logs associated with the third version of the first page are respectively 22, 25, and 28.

If the maximum visible LSN is 19, a transaction commit log whose LSN is 18 is the first transaction commit log, and the reference version of the first page is a version associated with the transaction commit log whose LSN is 18, that is, the second version of the first page. The transaction commit logs whose LSNs are respectively 12, 15, and 18 are sequentially replayed on the second version of the first page, to finally obtain the target version of the first page. The target version of the first page may indicate the log replay progress.

If the maximum visible LSN is 25, a transaction commit log whose LSN is 25 is the first transaction commit log, and the reference version of the first page is a version associated with the transaction commit log whose LSN is 25, that is, the third version of the first page. The transaction commit logs whose LSNs are 22 and 25 are sequentially replayed on the third version of the first page, to finally obtain the target version of the first page. The target version of the first page may indicate the log replay progress.

It should be noted that there are a plurality of forms of the first indication. This is not limited in this embodiment of this application.

The foregoing describes a method for replaying the at least one page operation log by the second thread. The following describes another method for replaying the at least one page operation log by the second thread.

In an example implementation, that the data node replays the at least one page operation log by using at least one second thread of the plurality of threads includes:

The data node replays, on an initial version of a second page in an LSN sequence by using one second thread of the plurality of threads, all page operation logs that are in the at least one page operation log and that include an operation on the second page, to obtain a plurality of versions of the second page, and each of the plurality of versions of the second page is associated with at least one of all the page operation logs including the operation on the second page.

The plurality of versions of the second page include a third version and a fourth version generated based on the third version, and the fourth version is obtained by replaying transaction commit logs associated with the third version in the LSN sequence on the third version.

A process in which the second thread replays the at least one page operation log to obtain the plurality of versions of the second page may be as follows.

The second thread in the data node sequentially associates a specific quantity of page operation logs with a version D (that is, the initial version) of the second page in an ascending order of respective LSNs of the at least one page operation log.

Then, the data node generates a version E of the second page based on the version D of the second page and the page operation logs associated with the version D of the second page. In this case, two versions of the second page are obtained.

Then, the second thread in the data node may continue to associate a specific quantity of page operation logs with the version E of the second page in an ascending order of respective LSNs of the at least one page operation log.

The data node then generates a version F of the second page based on the version E of the second page and the transaction commit logs associated with the version E of the second page. In this case, three versions of the second page are obtained.

The foregoing steps are repeated, to complete replaying of the at least one page operation log. In addition, a plurality of versions including the initial version of the second page can be obtained.

Similarly, after the plurality of versions of the first page including the initial version of the second page are obtained, the plurality of versions of the second page are usually stored into a memory. To reduce the memory occupied by the plurality of versions of the second page and prevent the plurality of versions of the second page from disappearing because the data node is shut down, the plurality of versions of the second page are usually written into a data memory.

In this embodiment of this application, a plurality of methods may be used to write the plurality of versions of the second page into the data memory. For example, the data node may directly write the plurality of versions of the second page into a data file in the data memory. Because there is a risk that the plurality of versions of the second page are damaged when the plurality of versions of the second page are directly written into the data file, the data node may write the plurality of versions of the second page into a double write file. Then, the plurality of versions of the second page in the double write file are written into the data file. In this way, it can be ensured that the plurality of versions of the second page are not damaged.

A quantity of versions of the second page is not limited in this embodiment of this application. The plurality of versions of the second page may include two versions, or may include three or more versions. A quantity of page operation logs associated with each of the plurality of versions of the second page is not limited in this embodiment of this application either.

For example, one version of the second page is generated, on the initial version of the second page, each time a specific quantity of transaction commit logs are replayed. Therefore, a quantity of page operation logs associated with each of the plurality of versions of the second page is the same.

For example, one version of the second page is generated, on the initial version of the second page, each time a page operation log is replayed for a period of time, that is, replay time of page operation logs associated with each of the plurality of versions of the second page is the same.

Based on the foregoing description, it can be learned that operations on a page in the page operation log may be continuously performed on the initial page, to continuously update the initial page. The at least one page operation log is replayed by using this method, and finally only a latest updated version of the initial page can be obtained. However, in this embodiment of this application, a plurality of versions of the second page may be finally obtained. Content of the second page after any page operation log is replayed can be viewed based on the plurality of versions of the second page.

Based on the foregoing embodiments, in another embodiment of the method for replaying a log on a data node provided in this application, the method further includes:

The data node replays, in response to a second indication, on a reference version of the second page in the LSN sequence, transaction commit logs associated with the reference version of the second page until a first page operation log is replayed, to obtain a target version of the second page, where the second indication is used to query log replay progress of the at least one page operation log.

The reference version of the second page is a version that is associated with the first page operation log and that is in the plurality of versions of the second page, and the first page operation log is a log whose LSN is the largest and whose LSN is less than or equal to the maximum visible LSN in all the page operation logs including the operation on the second page.

Finally, the method further includes determining the log replay progress of the at least one page operation log based on the target version of the second page.

For example, the plurality of versions of the second page include a first version of the second page, a second version of the second page, and a third version of the second page, and each version of the second page is associated with three page operation logs. LSNs of three page operation logs associated with the first version of the second page are respectively 1, 3, and 4. LSNs of three page operation logs associated with the second version of the second page are respectively 6, 7, and 9. LSNs of three page operation logs associated with the third version of the second page are respectively 10, 12, and 14.

If the maximum visible LSN is 8, a page operation log whose LSN is 7 is the first page operation log, and the reference version of the second page is a version associated with the page operation log whose LSN is 7, that is, the second version of the second page. Page operation logs whose LSNs are 6 and 7 are sequentially replayed on the second version of the second page, to finally obtain the target version of the second page. The target version of the second page may indicate the log replay progress.

If the maximum visible LSN is 13, a page operation log whose LSN is 12 is the first page operation log, and the reference version of the second page is a version associated with the page operation log whose LSN is 12, that is, the third version of the second page. Page operation logs whose LSNs are 10 and 12 are sequentially replayed on the third version of the second page, to finally obtain the target version of the second page. The target version of the second page may indicate the log replay progress.

It should be noted that there are a plurality of forms of the first indication. This is not limited in this embodiment of this application.

It can be learned with reference to the foregoing embodiments that, in a log replay process, the data node generates a plurality of versions of the first page and a plurality of versions of the second page, and the log replay progress may be viewed based on the plurality of versions of the first page and the plurality of versions of the second page. In addition, content of the first page after any transaction commit log is replayed can be viewed, or content of the second page after any operation log is replayed can be viewed. Therefore, if the log replay method provided in this embodiment of this application is applied to the secondary server of the cluster database system, the secondary server can read data. Further, the primary server is configured to write data, and the secondary server is configured to read data. In this way, a load when the primary server reads data and writes data at the same time can be reduced.

For ease of understanding, the following further describes, with reference to FIG. 4A, FIG. 4B, FIG. 5A, and FIG. 5B, a log replay method provided in an embodiment of this application.

As shown in FIG. 4A, FIG. 4B, FIG. 5A, and FIG. 5B, an application scenario of this example is that a primary server synchronizes a log to a secondary server through streaming replication, and then the secondary server replays the log. The example includes the following operations.

At block 201 the primary server sends the log to the secondary server. The primary server may send, to the secondary server by using a walsender thread, a log generated by the primary server, and the secondary server receives, by using the walreceiver thread, the log sent by the primary server, and stores the received log into a buffer.

At block 202, the secondary server stores the received log in a data memory by using the walreceiver thread, and sends a message to the primary server, where the message indicates that the log is written into the data memory.

At block 203, a read thread in a data node reads a byte stream into the buffer.

Figure 4A:
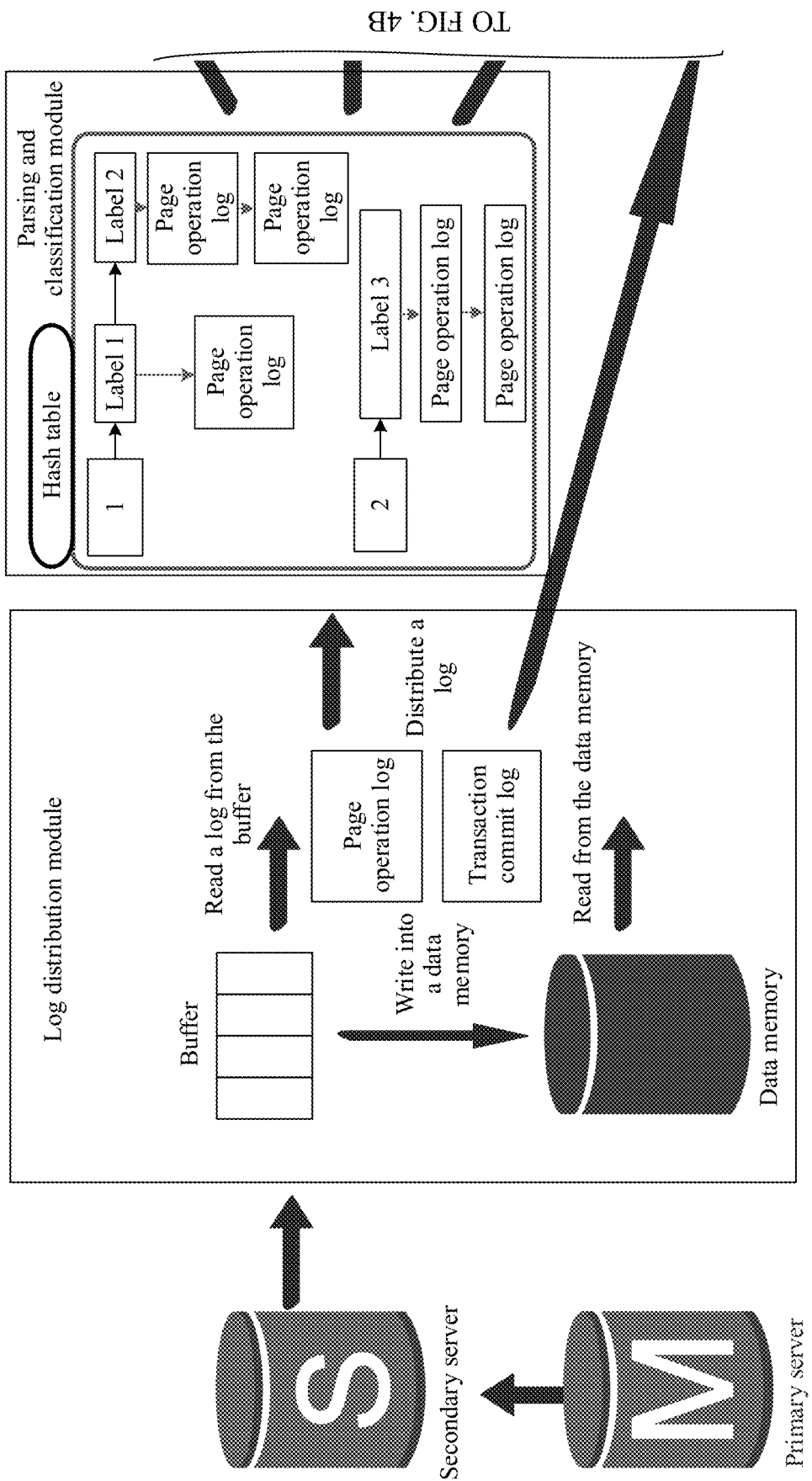
FIG. 4A and FIG. 4B are schematic diagrams of a third embodiment of a log replay method according to an embodiment of this application.
Figure 4B:
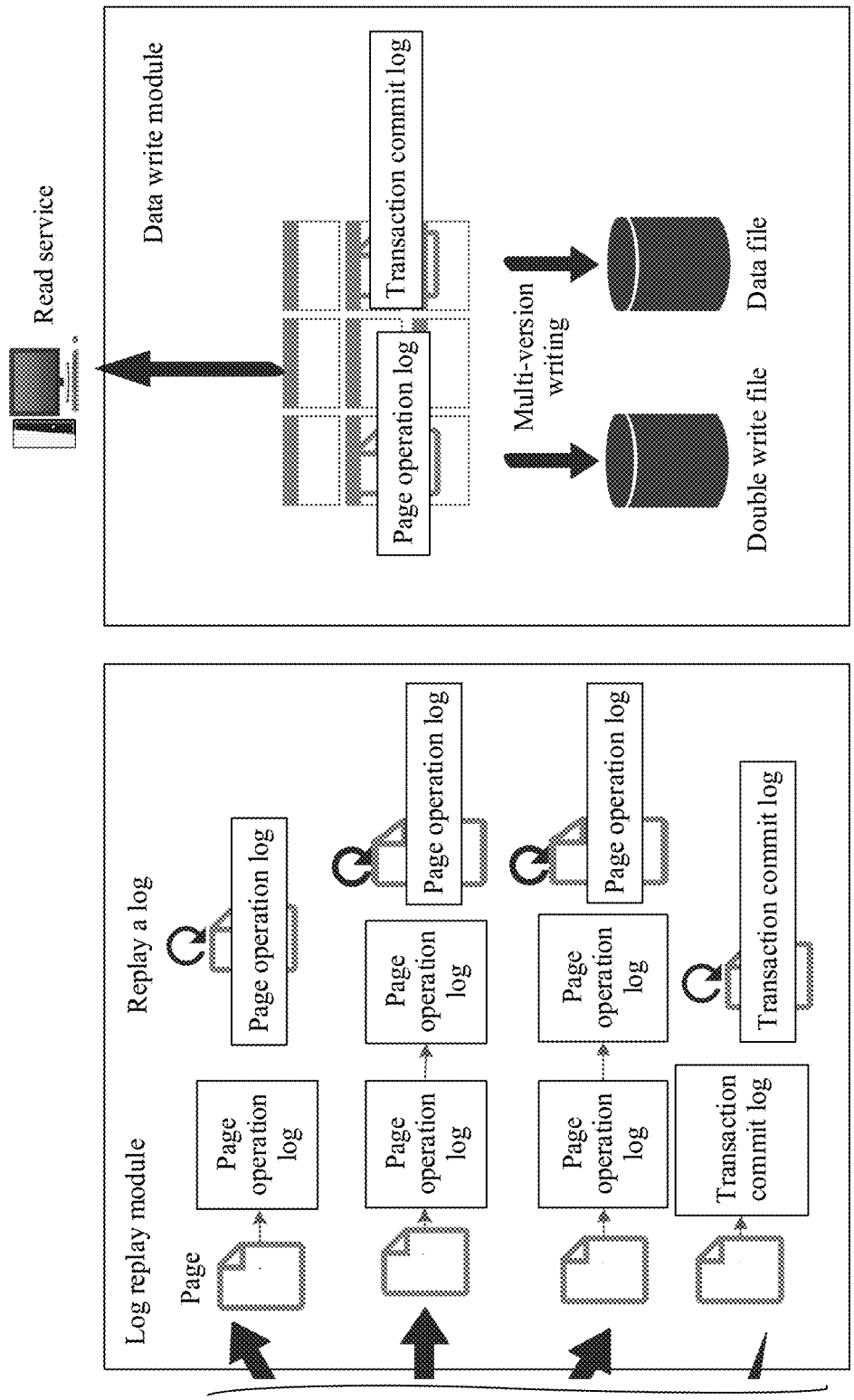
Figure 5A:
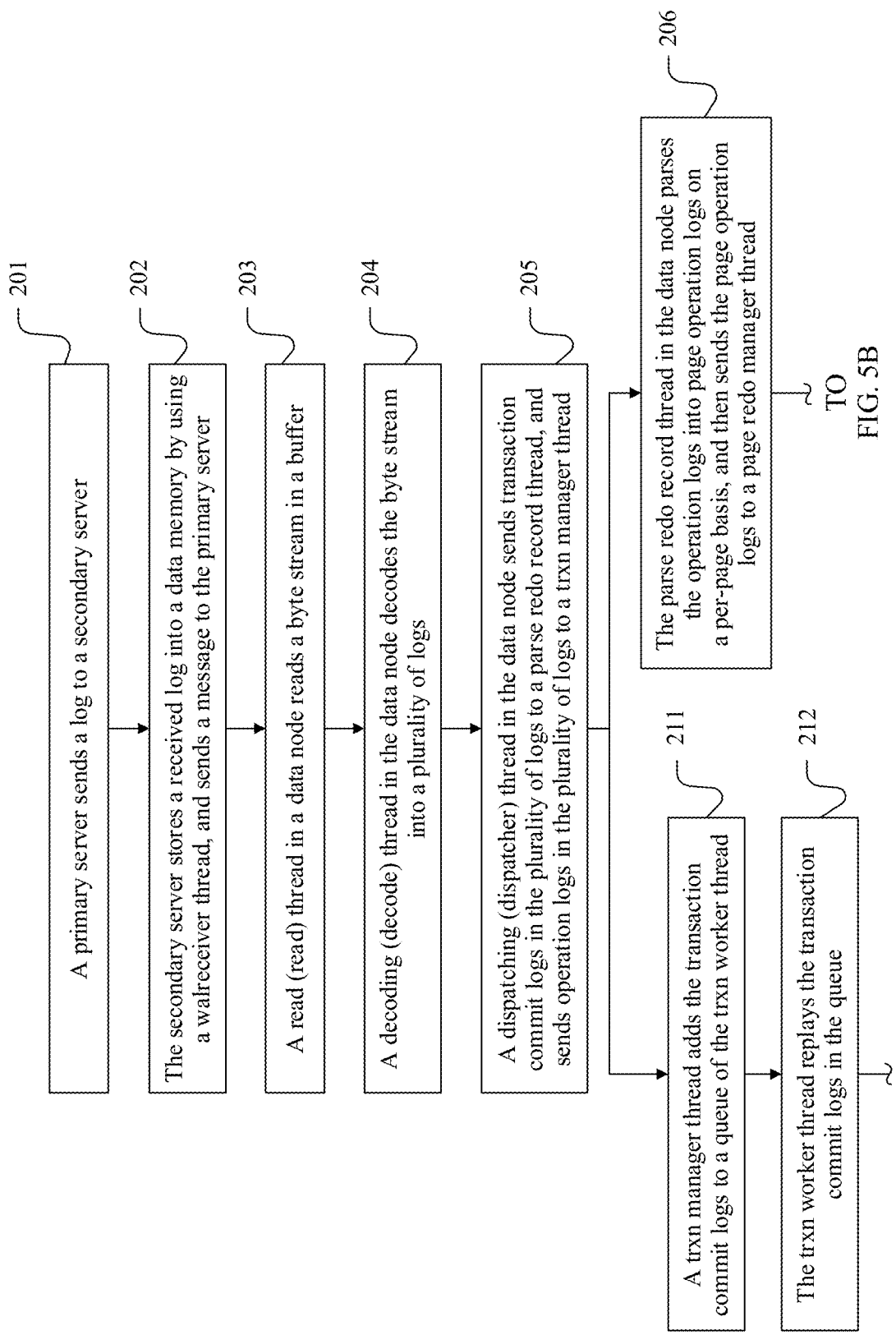
FIG. 5A and FIG. 5B are schematic diagrams of a fourth embodiment of a log replay method according to an embodiment of this application.
Figure 5B:
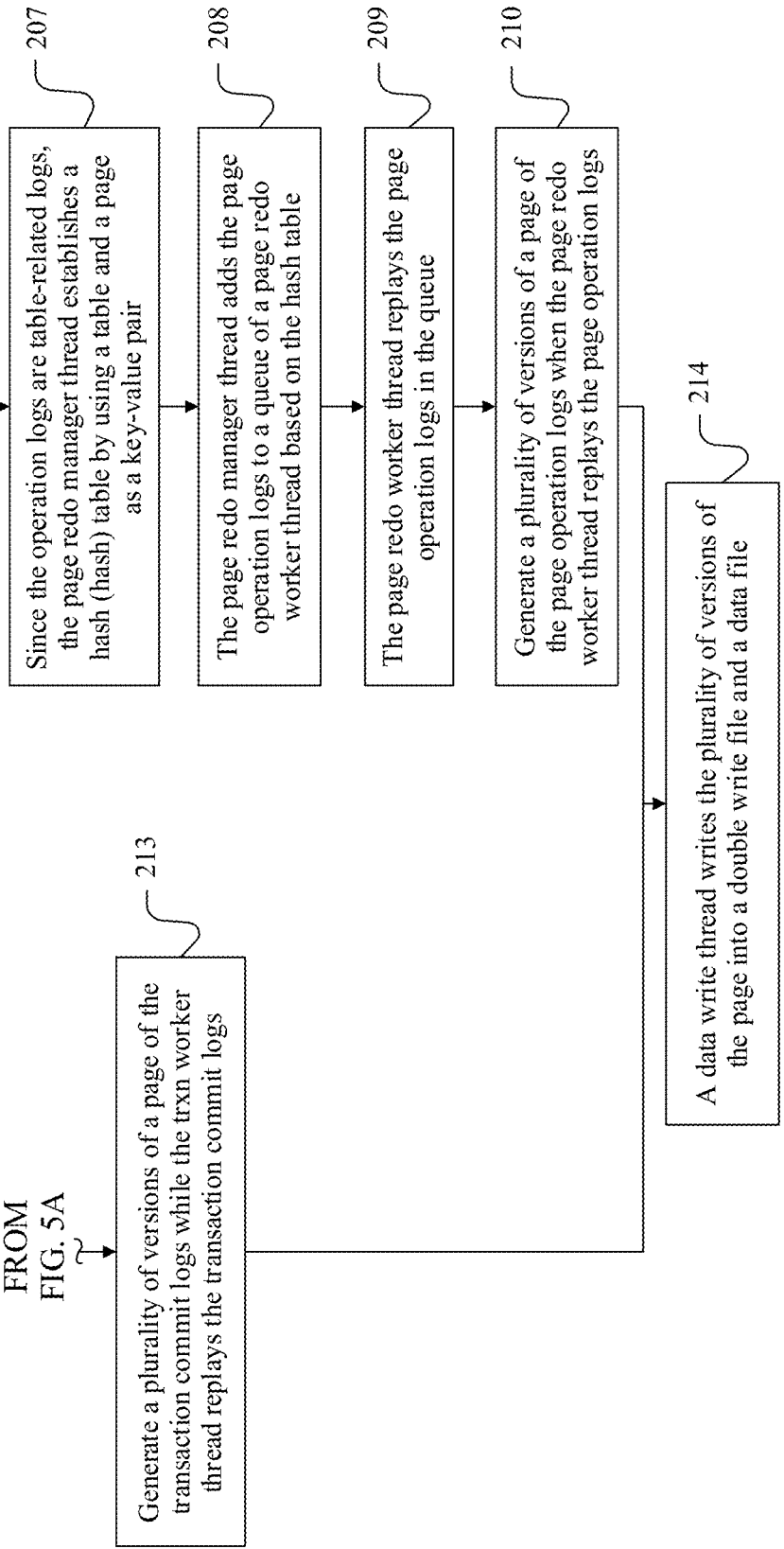

It can be seen from FIG. 4A and FIG. 4B that the data node may also read the byte stream from the data memory.

Operations depicted in blocks 202 and 203 are not subject to a specific sequence. For example, the operations described in blocks 202 and 203 may be performed at the same time. In the example in FIG. 5A, the operation in block 202 is performed first, and then the operations in block 203 is performed.

At block 204, a decoding thread in the data node decodes the byte stream into a plurality of logs.

At block 205, a dispatching thread in the data node sends transaction commit logs in the plurality of logs to a parse redo record thread, and sends operation logs in the plurality of logs to a trxn manager thread. In FIG. 4A, the read thread, the decoding thread, and the dispatching thread all belong to a log distribution module. A process of decoding the byte stream is not shown in FIG. 4A.

At block 206, the parse redo record thread in the data node parses the operation logs into page operation logs on a per-page basis, and then sends the page operation logs to a page redo manager thread.

It should be noted that, for a process in which the parse redo record thread parses the operation log, refer to related descriptions in the foregoing embodiment. Details are not described herein again.

At block 207, since the operation logs are table-related logs, the page redo manager thread establishes a hash table by using a table and a page as a key-value pair.

In the hash table, all page operation logs corresponding to a same page form a chain, and correspond to a label. Page operation logs in a same chain are sequentially arranged according to LSNs, and a newly received page operation log is placed at a tail of the chain. As shown in FIG. 4A, a page operation log under a label 1 is an operation log corresponding to one page, a page operation log under a label 2 is an operation log corresponding to one page, and a page operation log under a label 3 is an operation log corresponding to another page.

In FIG. 4A, the parse redo record thread and the page redo manager thread belong to a parsing and classification module. A process in which the parse redo record thread parses an operation log is not shown in FIG. 4A.

At block 208, the page redo manager thread adds the page operation logs to a queue of a page redo worker thread based on the hash table.

All page operation logs including an operation on a same page are located in a queue of a same page redo worker thread, and are sequentially arranged according to LSNs. It should be noted that, in the queue of the same page redo worker thread, it only needs to be ensured that all page operation logs including an operation on a same page are sequentially arranged according to LSNs, and a sequence of page operation logs including operations on different pages may be random.

At block 209, the page redo worker thread replays the page operation log in the queue.

It should be noted that, for a process in which the page redo worker replays the page operation log, refer to related descriptions of replaying the page operation log in the foregoing embodiment. Details are not described herein again.

At block 210, the operations include generating a plurality of versions of a page of the page operation logs when the page redo worker thread replays the page operation logs.

It should be noted that, for a process of generating the plurality of versions of the page of the page operation logs, refer to related descriptions of replaying the page operation log in the foregoing embodiment. Details are not described herein again.

At block 211, the trxn manager thread adds the transaction commit logs to a queue of the trxn worker thread.

The transaction commit logs are sequentially arranged in the queue of the trxn worker thread according to LSNs.

At block 212, the trxn worker thread replays the transaction commit logs in the queue.

The page redo worker thread and trxn worker thread belong to a log replay module.

It should be noted that, for a process in which the trxn worker thread replays the transaction commit logs, refer to related descriptions of replaying the transaction commit log in the foregoing embodiment. Details are not described herein again.

At block 213, the operations include generating a plurality of versions of a page of the transaction commit logs while the trxn worker thread replays the transaction commit logs.

It should be noted that, for a process of generating the plurality of versions of the page of the transaction commit logs, refer to related descriptions of replaying the transaction commit log in the foregoing embodiment. Details are not described herein again.

At block 214, a data write thread writes the plurality of versions of the page into a double write file and a data file, where the data write thread belongs to a data write module.

It should be noted that, for a process of writing the plurality of versions of the page into the double write file and the data file, refer to related descriptions of writing the plurality of versions of the page into the data memory in the foregoing embodiment. Details are not described herein again.

It can be learned from FIG. 4A and FIG. 4B that a plurality of versions of a page can be read by a secondary server, that is, a read service can be provided for a client.

The foregoing embodiments describes replaying the transaction commit log and the page operation log. In addition, the logs may further include a checkpoint log, a tablespace creation log, a tablespace deletion log, a data space creation log, and a data space deletion log.

The checkpoint log includes an operation of periodically refreshing data into the buffer to the data memory. The tablespace creation log includes an operation of creating a new table, and correspondingly the tablespace deletion log includes an operation of deleting a table. The data space creation log includes an operation of creating a database, and correspondingly the data space deletion log includes an operation of deleting a database.

It should be noted that the first thread may be used to replay the checkpoint log, that is, the first thread is used to replay the transaction commit log and the checkpoint log. In this case, a process in which the first thread replays the checkpoint log may interact with a process in which the second thread replays the page operation log. However, a process in which the first thread replays a transaction commit log is independent of a process in which the second thread replays a page operation log.

Another thread may be used to replay the tablespace creation log, the tablespace deletion log, the data space creation log, and the data space deletion log. For example, the page redo manager thread may be used to replay the tablespace creation log, the tablespace deletion log, the data space creation log, and the data space deletion log. It may be understood that operations in the tablespace creation log, the tablespace deletion log, the data space creation log, and the data space deletion log cause a page change. Therefore, a process of replaying the tablespace creation log, the tablespace deletion log, the data space creation log, and the data space deletion log may interact with a process in which the second thread replays the page operation log.

The foregoing describes the log replay method provided in embodiments of this application, and the following describes several scenarios to which the method may be applied.

Figure 6A:
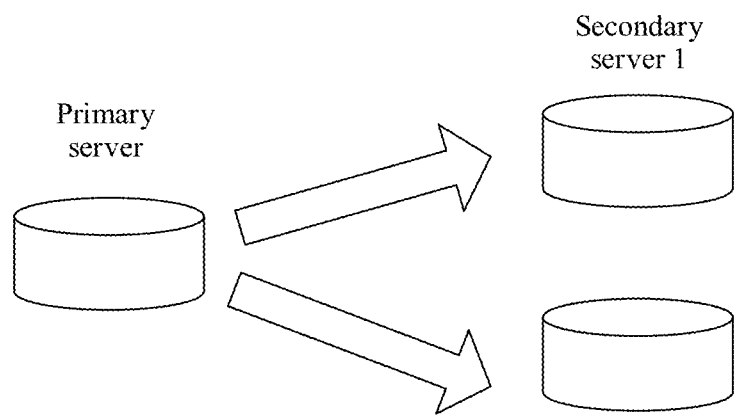
FIG. 6(a) is a schematic diagram of a first architecture of a database system according to an embodiment of this application.
Figure 6B:
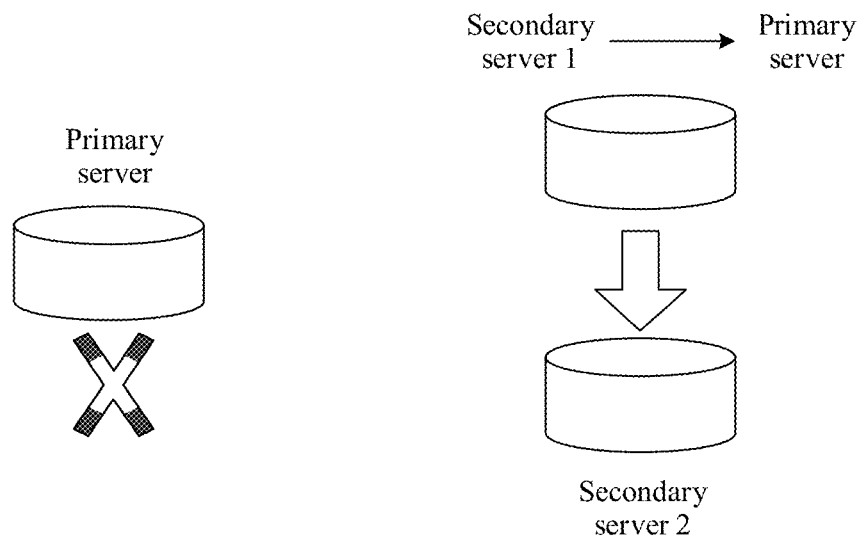
FIG. 6(b) is a schematic diagram of a first architecture of a database system according to an embodiment of this application.

First scenario: As shown in FIG. 6(a) and FIG. 6(b), the log replay method provided in embodiments of this application may be applied to a simple database with one primary server and a plurality of secondary servers. In FIG. 6(a) and FIG. 6(b), there are two secondary servers. As shown in FIG. 6(a), when the primary server runs normally, the primary server synchronizes a log to the two secondary servers. As shown in FIG. 6(b), after the primary server is shut down abnormally, one of the two secondary servers becomes the primary server, and the log is synchronized to the other secondary server.

Therefore, the log replay method provided in embodiments of this application may be used to replay logs on both of the two secondary servers. This can improve a log replay speed, avoid accumulation of a large quantity of logs on the secondary server, and improve a speed of starting to work after the secondary server becomes the primary server.

Figure 7:
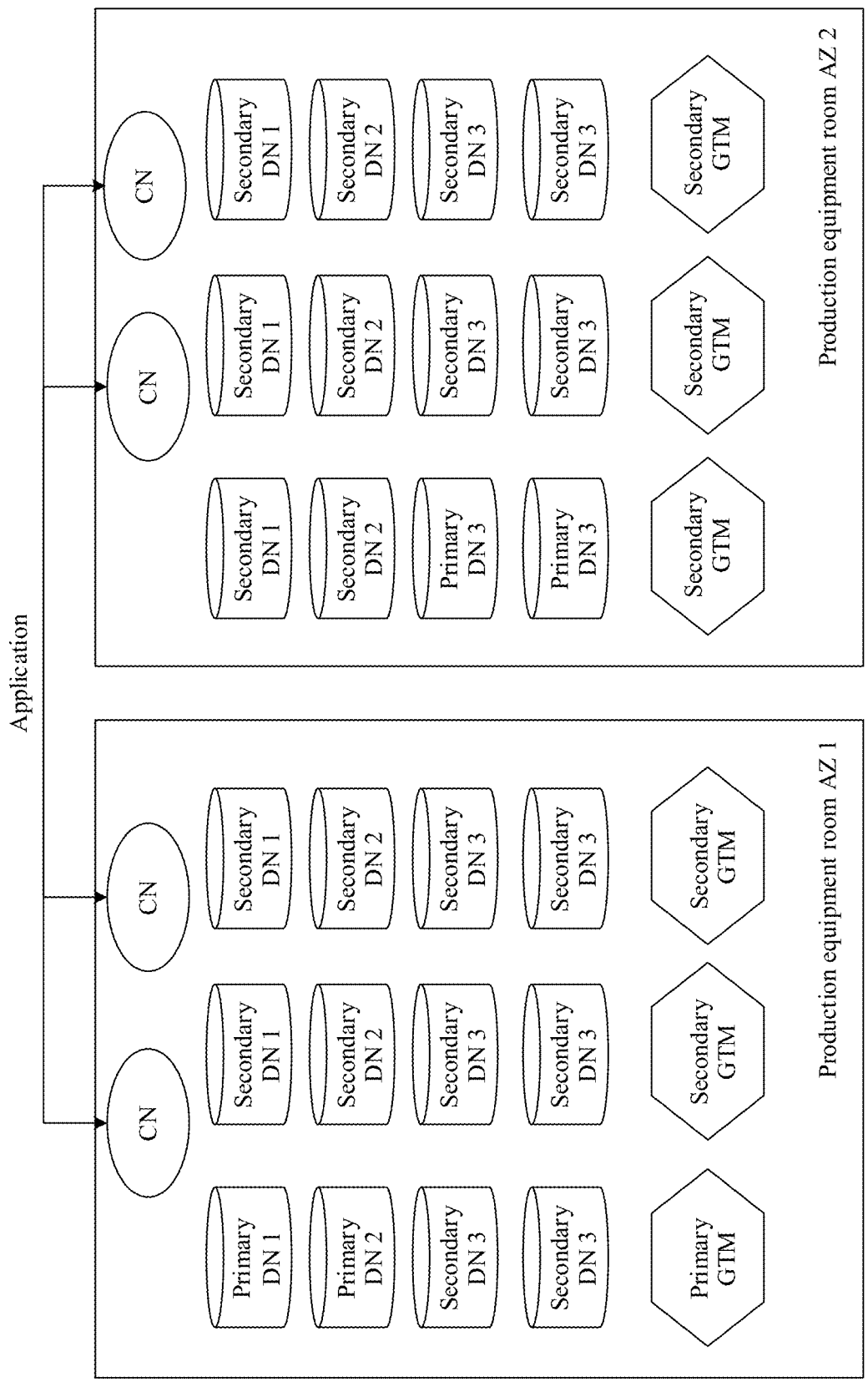
FIG. 7 is a schematic diagram of a second architecture of a database system according to an embodiment of this application.

Second scenario: As shown in FIG. 7, the log replay method provided in embodiments of this application may be applied to a terminal cloud platform. The terminal cloud platform includes a production equipment room AZ, a coordinator node CN, a transaction management node GTM, and a data node DN. All machines in a same equipment room belong to a same AZ. As shown in FIG. 7, the terminal cloud platform includes two AZs. A plurality of CNs can be deployed in each equipment room as an entry for connecting to a client. In FIG. 7, two CNs are disposed in each equipment room. In FIG. 7, the terminal cloud platform includes six GTMs, where one GTM is an active GTM, and other GTMs are standby GTMs. In FIG. 7, the terminal cloud platform includes 24 data nodes DNs, where four DNs are primary servers, and each primary server corresponds to five DNs used as secondary servers.

Similarly, on a DN used as a secondary server, a log may be replayed by using the log replay method provided in embodiments of this application. This can improve a log replay speed, avoid accumulation of a large quantity of logs on the secondary server, and improve a speed of starting to work after the secondary server becomes the primary server.

Figure 8:
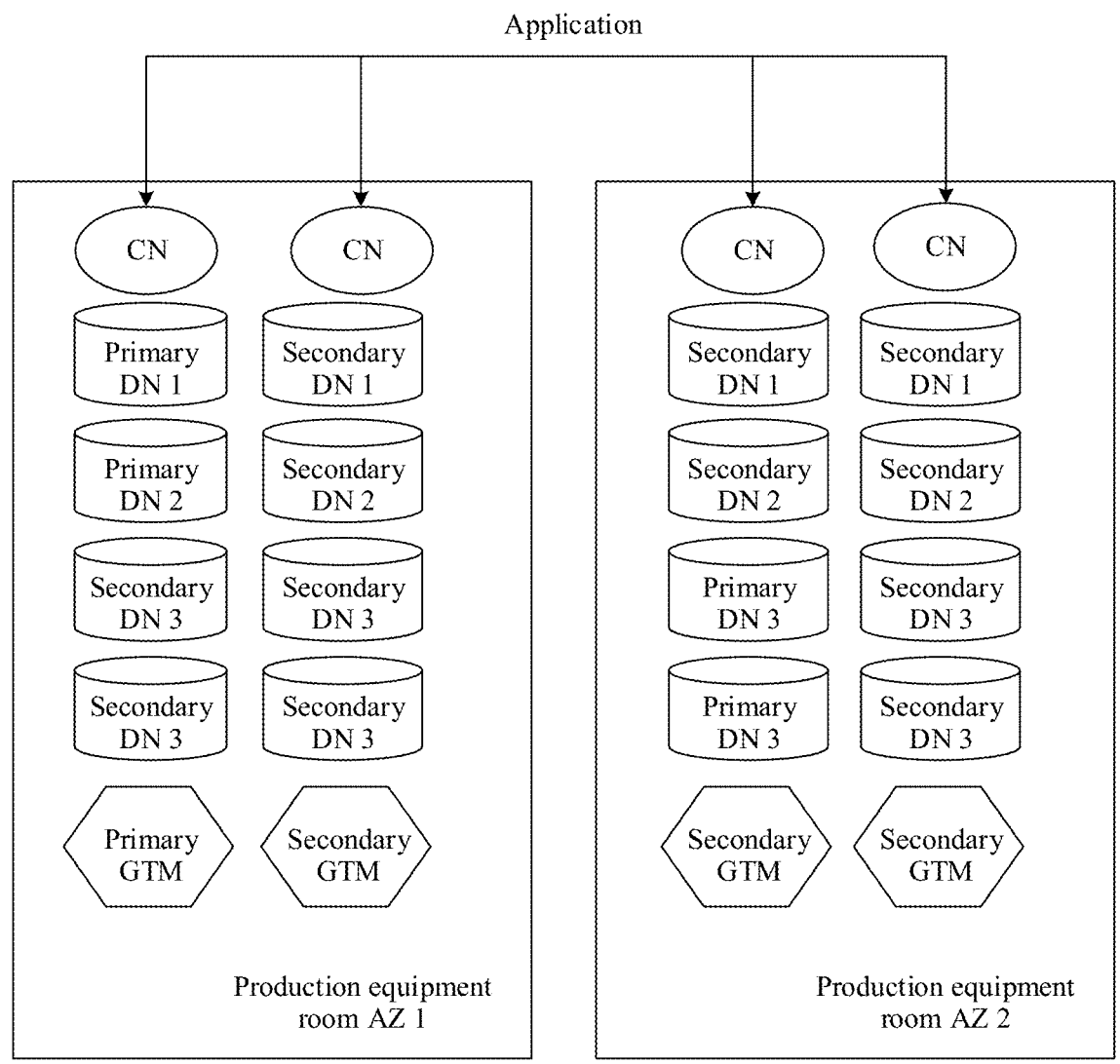
FIG. 8 is a schematic diagram of a third architecture of a database system according to an embodiment of this application.

Third scenario: As shown in FIG. 8, the log replay method provided in embodiments of this application may be applied to a public cloud platform. An architecture of the public cloud platform is similar to an architecture of the terminal cloud platform shown in FIG. 7. For details, refer to the foregoing related descriptions. A quantity of components in the public cloud platform shown in FIG. 8 may be determined based on a scale of the public cloud platform.

Similarly, a log may be replayed, on a DN used as a secondary server, by using the log replay method provided in embodiments of this application. This can improve a log replay speed, avoid accumulation of a large quantity of logs on the secondary server, and improve a speed of starting to work after the secondary server becomes the primary server.

Figure 9:
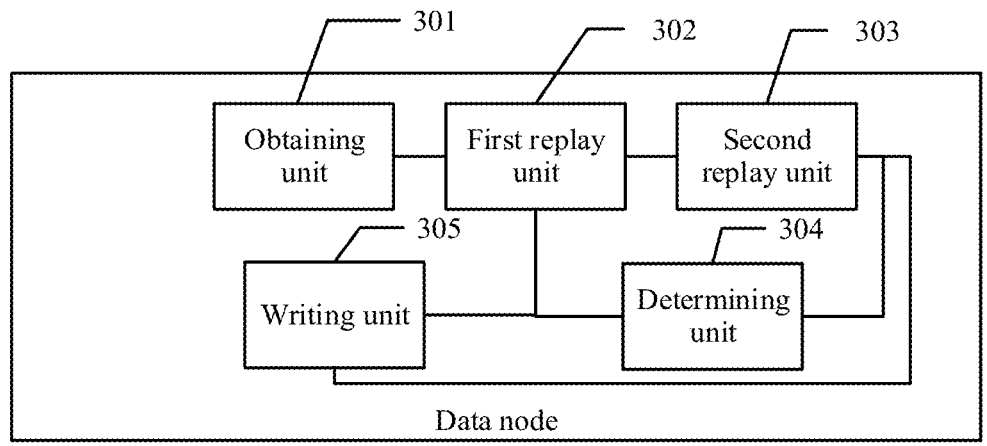
FIG. 9 is a schematic diagram of an embodiment of a data node according to an embodiment of this application.

FIG. 9 is a schematic diagram of a structure of a data node according to an embodiment of this application. As shown in FIG. 9, an embodiment of this application provides an embodiment of a data node. A plurality of threads run on the data node. The data node includes:

an obtaining unit 301, configured to obtain a plurality of logs, where the plurality of logs include at least one transaction commit log and at least one page operation log, each of the at least one transaction commit log includes a transaction commit operation, and each of the at least one page operation log includes one or more operations on one page;

a first replay unit 302, configured to replay the at least one transaction commit log by using a first thread of the plurality of threads; and a second replay unit 303, configured to replay the at least one page operation log by using at least one second thread of the plurality of threads, where all page operation logs that are in the at least one page operation log and that include an operation on a same page are replayed by using a same second thread.

A process in which the first thread replays the at least one transaction commit log is independent of a process in which the at least one second thread replays the at least one page operation log.

In another embodiment of the data node provided in this embodiment of this application, the obtaining unit 301 is configured to: obtain the at least one transaction commit log and at least one operation log from a buffer; and parse the at least one operation log to obtain at least one page operation log, where each of the at least one operation log includes an operation on one or more pages; and the at least one page operation log includes a first page operation log, and an LSN of the first page operation log is the same as an LSN of an operation log which is parsed to obtain the first page operation log.

In another embodiment of the data node provided in this embodiment of this application, the data node further includes a determining unit 304, configured to determine a maximum visible LSN, where the maximum visible LSN indicates log replay progress; and all transaction commit logs whose log sequence numbers LSNs are less than or equal to the maximum visible LSN in the at least one transaction commit log are replayed, and all page operation logs whose log sequence numbers LSNs are less than or equal to the maximum visible LSN in the at least one page operation log are replayed.

In another embodiment of the data node provided in this embodiment of this application, the first replay unit 302 is configured to replay, by using the first thread of the plurality of threads, the at least one transaction commit log on an initial version of a first page in an LSN sequence, to obtain a plurality of versions of the first page, and each of the plurality of versions of the first page is associated with at least one of the at least one transaction commit log. The plurality of versions of the first page include a first version of the first page and a second version of the first page that is generated based on the first version of the first page, where the second version of the first page is obtained by replaying, on the first version of the first page in the LSN sequence, transaction commit logs associated with the first version of the first page.

In another embodiment of the data node provided in this embodiment of this application, the data node further includes a writing unit 305, configured to: write the plurality of versions of the first page into a double write file; and write the plurality of versions of the first page in the double write file into a data file.

In another embodiment of the data node provided in this embodiment of this application, a quantity of transaction commit logs associated with each of the plurality of versions of the first page is the same, or replay time of transaction commit logs associated with each of the plurality of versions of the first page is the same.

In another embodiment of the data node provided in this embodiment of this application, the first replay unit 302 is further configured to replay, in response to a first indication, on a reference version of the first page in the LSN sequence, transaction commit logs associated with the reference version of the first page until a first transaction commit log is replayed, to obtain a target version of the first page, where the first indication is used to query log replay progress of the at least one transaction commit log.

The reference version of the first page is a version that is associated with the first transaction commit log and that is in the plurality of versions of the first page, and the first transaction commit log is a log whose LSN is the largest and whose LSN is less than or equal to the maximum visible LSN in the at least one transaction commit log.

The first replay unit 302 is further configured to determine the log replay progress of the at least one transaction commit log based on the target version of the first page.

In another embodiment of the data node provided in this embodiment of this application, the second replay unit 303 is configured to: replay, by using one second thread of the plurality of threads, on an initial version of a second page in an LSN sequence, all page operation logs that are in the at least one page operation log and that include an operation on the second page, to obtain a plurality of versions of the second page, and each of the plurality of versions of the second page is associated with at least one of all the page operation logs including the operation on the second page.

The plurality of versions of the second page include a first version of the second page and a second version of the second page that is generated based on the first version of the second page, where the second version of the second page is obtained by replaying, on the first version of the second page in the LSN sequence, page operation logs associated with the first version of the second page.

In another embodiment of the data node provided in this embodiment of this application, the data node further includes a writing unit 305, configured to: write the plurality of versions of the second page into a double write file; and write the plurality of versions of the second page in the double write file into a data file.

In another embodiment of the data node provided in this embodiment of this application, a quantity of page operation logs associated with each of the plurality of versions of the second page is the same, or replay time of page operation logs associated with each of the plurality of versions of the second page is the same.

In another embodiment of the data node provided in this embodiment of this application, the second replay unit 303 is further configured to: replay, in response to a second indication, on a reference version of the second page in the LSN sequence, transaction commit logs associated with the reference version of the second page until a first page operation log is replayed, to obtain a target version of the second page, where the second indication is used to query log replay progress of the at least one page operation log.

The reference version of the second page is a version that is associated with the first page operation log and that is in the plurality of versions of the second page, and the first page operation log is a log whose LSN is the largest and whose LSN is less than or equal to the maximum visible LSN in all the page operation logs including the operation on the second page.

The second replay unit 303 is further configured to determine the log replay progress of the at least one page operation log based on the target version of the second page.

Figure 10:
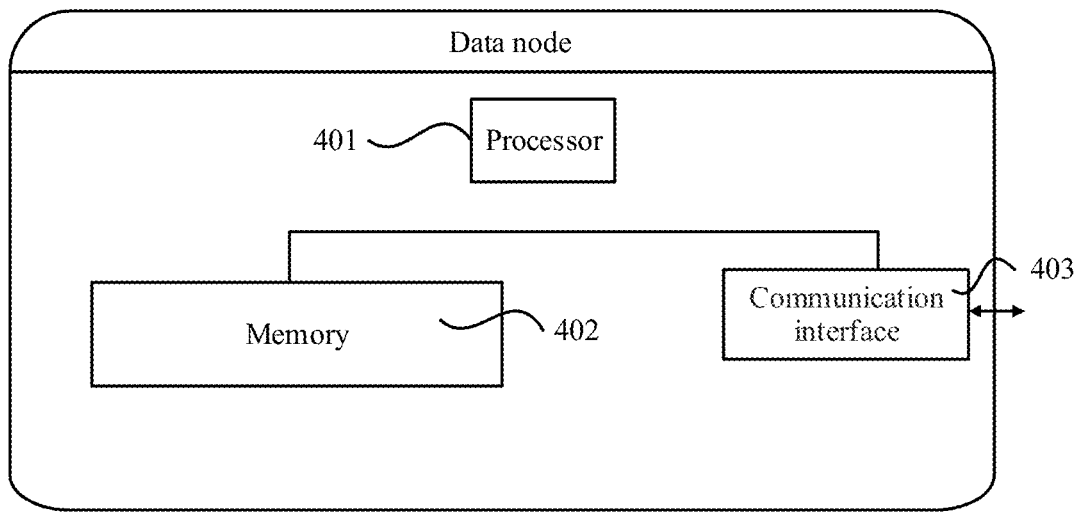
FIG. 10 is a schematic diagram of an embodiment of a data node according to an embodiment of this application.

FIG. 10 discloses a data node according to some embodiments of this application. The data node may include one or more processors 401, a memory 402, and a communication interface 403.

The memory 402 may be transitory storage or persistent storage. Still further, the processor 401 may be configured to communicate with the memory 402, and perform, on the data node, a series of instruction operations in the memory 402.

In this embodiment, the processor 401 may perform the operations performed by the data node in the embodiment shown in FIG. 9. Details are not described herein again.

In this embodiment, specific function module division in the processor 401 may be similar to the function module division manner described in FIG. 9. Details are not described herein again.

An embodiment of this application further provides a chip or a chip system. The chip or the chip system includes at least one processor and a communication interface. The communication interface is interconnected to the at least one processor by using a line. The at least one processor is configured to run a computer program or instructions, to perform operations performed by the data node in the embodiment shown in FIG. 9. Details are not described herein again.

The communication interface in the chip may be an input/output interface, a pin, a circuit, or the like.

An embodiment of this application further provides a first implementation of a chip or a chip system. The chip or the chip system described above in this application further includes at least one memory, and the at least one memory stores instructions. The memory may be a storage unit inside the chip, for example, a register or a cache, or may be a storage unit (for example, a read-only memory or a random access memory) of the chip.

An embodiment of this application further provides a computer storage medium. The computer storage medium is configured to store computer software instructions used by the foregoing control device, and the computer software instructions include a program for use at a data node.

The data node may be the data node described in FIG. 9.

An embodiment of this application further provides a computer program product. The computer program product includes computer software instructions, and the computer software instructions may be loaded by a processor to implement a procedure in the method provided in any one of FIG. 2, FIG. 5A, and FIG. 5B.

Figure 11:
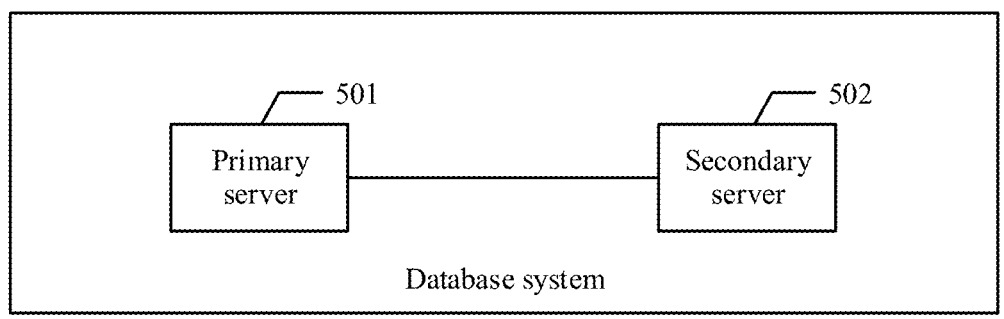
FIG. 11 is a schematic diagram of a structure of a database system according to an embodiment of this application.

FIG. 11 illustrates an example database system according to some embodiments of the present disclosure. The database system includes a primary server 501 and at least one secondary server 502.

The primary server 501 is configured to send a log to the at least one secondary server 502. Each of the at least one secondary server 502 is configured to replay the log according to the method provided in any one of FIG. 2, FIG. 5A, and FIG. 5B.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

What is claimed is:

1. A method for replaying a log comprising:
obtaining, by a data node having a plurality of threads running therein, a plurality of logs including at least one transaction commit log and at least one page operation log, wherein each of the at least one transaction commit log comprises a transaction commit operation, and each of the at least one page operation log comprises one or more operations on one page;
replaying, by the data node, the at least one transaction commit log by using a first thread of the plurality of threads;
replaying, by the data node, the at least one page operation log by using at least one second thread of the plurality of threads, wherein all page operation logs that are in the at least one page operation log and that comprise an operation on a same page are replayed by using a same second thread; and
determining, by the data node, a maximum visible log sequence number (LSN), wherein the maximum visible LSN indicates a log replay progress;
wherein all transaction commit logs whose log sequence numbers (LSNs) are less than or equal to the maximum visible LSN in the at least one transaction commit log are replayed, and all page operation logs whose LSNs are less than or equal to the maximum visible LSN in the at least one page operation log are replayed; and
wherein a process in which the first thread replays the at least one transaction commit log is independent of a process in which the at least one second thread replays the at least one page operation log.

2. The method according to claim 1, wherein obtaining the plurality of logs comprises:
parsing, by the data node, at least one operation log to obtain the at least one page operation log, wherein each of the at least one operation log comprises an operation on one or more pages;
wherein the at least one page operation log comprises a first page operation log, and an LSN of the first page operation log is the same as an LSN of an operation log which is parsed to obtain the first page operation log.

3. The method according to claim 1, wherein replaying the at least one transaction commit log comprises:
replaying, by the data node by using the first thread of the plurality of threads, the at least one transaction commit log on an initial version of a first page in an LSN sequence, to obtain a plurality of versions of the first page, and each of the plurality of versions of the first page is associated with at least one of the at least one transaction commit log;
wherein the plurality of versions of the first page comprise a first version of the first page and a second version of the first page that is generated based on the first version of the first page, wherein the second version of the first page is obtained by replaying, on the first version of the first page in the LSN sequence, transaction commit logs associated with the first version of the first page.

4. The method according to claim 3, wherein a quantity of transaction commit logs associated with each of the plurality of versions of the first page is the same, or replay time of transaction commit logs associated with each of the plurality of versions of a second page is the same.

5. The method according to claim 3, further comprising:
replaying, by the data node, in response to a first indication, on a reference version of the first page in the LSN sequence, transaction commit logs associated with the reference version until a first transaction commit log is relayed, to obtain a target version of the first page, wherein the first indication is used to query log replay progress of the at least one transaction commit log,
wherein the reference version of the first page is a version that is associated with the first transaction commit log and that is in the plurality of versions of the first page, and the first transaction commit log is a log whose LSN is the largest and whose LSN is less than or equal to the maximum visible LSN in the at least one transaction commit log; and
determining the log replay progress of the at least one transaction commit log based on the target version of the first page.

6. The method according to claim 1, wherein replaying the at least one page operation log comprises:
replaying, by the data node by using one second thread of the plurality of threads, on an initial version of a second page in an LSN sequence, all page operation logs that are in the at least one page operation log and that comprise an operation on the second page, to obtain a plurality of versions of the second page, and each of the plurality of versions of the second page is associated with at least one of all page operation logs comprising the operation on the second page;
wherein the plurality of versions of the second page comprise a first version of the second page and a second version of the second page that is generated based on the first version of the second page, and the second version of the second page is obtained by replaying, on the first version of the second page in the LSN sequence, page operation logs associated with the first version of the second page.

7. The method according to claim 6, wherein a quantity of page operation logs associated with each of the plurality of versions of the second page is the same, or replay time of page operation logs associated with each of the plurality of versions of the second page is the same.

8. The method according to claim 6, further comprising:
replaying, by the data node, in response to a second indication, on a reference version of the second page in the LSN sequence, transaction commit logs associated with the reference version until a first page operation log is replayed, to obtain a target version of the second page, wherein the second indication is used to query log replay progress of the at least one page operation log,
wherein the reference version of the second page is a version that is associated with the first page operation log and that is in the plurality of versions of the second page, and the first page operation log is a log whose LSN is the largest and whose LSN is less than or equal to the maximum visible LSN in all the page operation logs comprising the operation on the second page; and
determining the log replay progress of the at least one page operation log based on the target version of the second page.

9. A data node, comprising:
at least one processor executing a plurality of threads; and one or more memories coupled to the at least one processor and storing programming instructions therein for execution by the at least one processor to cause the data node to:
  obtain a plurality of logs having at least one transaction commit log and at least one page operation log, wherein each of the at least one transaction commit log comprises a transaction commit operation, and each of the at least one page operation log comprises one or more operations on one page;
  replay the at least one transaction commit log by using a first thread of the plurality of threads;
  replay the at least one page operation log by using at least one second thread of the plurality of threads, wherein all page operation logs that are in the at least one page operation log and that comprise an operation on a same page are replayed by using a same second thread; and
  determine a maximum visible log sequence number (LSN), wherein the maximum visible LSN indicates a log replay progress;
  wherein a process in which the first thread replays the at least one transaction commit log is independent of a process in which the at least one second thread replays the at least one page operation log;
  wherein all transaction commit logs whose log sequence numbers (LSNs) are less than or equal to the maximum visible LSN in the at least one transaction commit log are replayed, and all page operation logs whose LSNs are less than or equal to the maximum visible LSN in the at least one page operation log are replayed.

10. The data node according to claim 9, wherein the programming instructions, when executed by the at least one processor, cause the data node to:
  parse at least one operation log to obtain the at least one page operation log, wherein each of the at least one operation log comprises an operation on one or more pages;
  wherein the at least one page operation log comprises a first page operation log, and an LSN of the first page operation log is the same as an LSN of an operation log which is parsed to obtain the first page operation log.

11. The data node according to claim 9, wherein the programming instructions, when executed by the at least one processor, cause the data node to:
  replay, by using the first thread of the plurality of threads, the at least one transaction commit log on an initial version of a first page in an LSN sequence, to obtain a plurality of versions of the first page, and each of the plurality of versions of the first page is associated with at least one of the at least one transaction commit log;
  wherein the plurality of versions of the first page comprise a first version of the first page and a second version of the first page that is generated based on the first version of the first page, wherein the second version of the first page is obtained by replaying, on the first version of the first page in the LSN sequence, transaction commit logs associated with the first version of the first page.

12. The data node according to claim 11, wherein a quantity of transaction commit logs associated with each of the plurality of versions of the first page is the same, or replay time of transaction commit logs associated with each of the plurality of versions of a second page is the same.

13. The data node according to claim 11, wherein the programming instructions, when executed by the at least one processor, cause the data node to:
  replay in response to a first indication, on a reference version of the first page in the LSN sequence, transaction commit logs associated with the reference version until a first transaction commit log is relayed, to obtain a target version of the first page,
  wherein the first indication is used to query log replay progress of the at least one transaction commit log; wherein the reference version of the first page is a version that is associated with the first transaction commit log and that is in the plurality of versions of the first page, and the first transaction commit log is a log whose LSN is the largest and whose LSN is less than or equal to the maximum visible LSN in the at least one transaction commit log; and
  determine the log replay progress of the at least one transaction commit log based on the target version of the first page.

14. The data node according to claim 9, wherein the programming instructions, when executed by the at least one processor, cause the data node to:
  replay, by using one second thread of the plurality of threads, on an initial version of a second page in an LSN sequence, all page operation logs that are in the at least one page operation log and that comprise an operation on the second page, to obtain a plurality of versions of the second page, and each of the plurality of versions of the second page is associated with at least one of all page operation logs comprising the operation on the second page;
  wherein the plurality of versions of the second page comprise a first version of the second page and a second version of the second page that is generated based on the first version of the second page, and the second version of the second page is obtained by replaying, on the first version of the second page in the LSN sequence, page operation logs associated with the first version of the second page.

15. The data node according to claim 14, wherein a quantity of page operation logs associated with each of the plurality of versions of the second page is the same, or replay time of page operation logs associated with each of the plurality of versions of the second page is the same.

16. The data node according to claim 14, wherein the programming instructions, when executed by the at least one processor, cause the data node to:
  replay in response to a second indication, on a reference version of the second page in the LSN sequence, transaction commit logs associated with the reference version until a first page operation log is replayed, to obtain a target version of the second page,
  wherein the second indication is used to query log replay progress of the at least one page operation log; the reference version of the second page is a version that is associated with the first page operation log and that is in the plurality of versions of the second page, and the first page operation log is a log whose LSN is the largest and whose LSN is less than or equal to the maximum visible LSN in all the page operation logs comprising the operation on the second page; and
  determine the log replay progress of the at least one page operation log based on the target version of the second page.

17. A non-transitory machine-readable medium having instructions stored therein, which when executed by a data node having a plurality of threads running therein, cause the data node to perform operations, the operations comprising:
  obtaining a plurality of logs including at least one transaction commit log and at least one page operation log, wherein each of the at least one transaction commit log comprises a transaction commit operation, and each of the at least one page operation log comprises one or more operations on one page;

replaying the at least one transaction commit log by using a first thread of the plurality of threads;

replaying the at least one page operation log by using at least one second thread of the plurality of threads, wherein all page operation logs that are in the at least one page operation log and that comprise an operation on a same page are replayed by using a same second thread; and determining, by the data node, a maximum visible log sequence number (LSN), wherein the maximum visible LSN indicates a log replay progress;

wherein all transaction commit logs whose log sequence numbers (LSNs) are less than or equal to the maximum visible LSN in the at least one transaction commit log are replayed, and all page operation logs whose LSNs are less than or equal to the maximum visible LSN in the at least one page operation log are replayed; and wherein a process in which the first thread replays the at least one transaction commit log is independent of a process in which the at least one second thread replays the at least one page operation log.

18. The non-transitory machine-readable medium according to claim 17, wherein obtaining the plurality of logs comprises:

parsing at least one operation log to obtain the at least one page operation log, wherein each of the at least one operation log comprises an operation on one or more pages;

wherein the at least one page operation log comprises a first page operation log, and an LSN of the first page operation log is the same as an LSN of an operation log which is parsed to obtain the first page operation log.

* * * * *